United States Patent
Salkintzis

(10) Patent No.: US 10,986,481 B2
(45) Date of Patent: Apr. 20, 2021

(54) METHOD TO AUTHENTICATE WITH A MOBILE COMMUNICATION NETWORK

(71) Applicants: Motorola Mobility LLC, Chicago, IL (US); Apostolis Salkintzis, Athens (GR)

(72) Inventor: Apostolis Salkintzis, Athens (GR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/347,322

(22) PCT Filed: May 8, 2017

(86) PCT No.: PCT/EP2017/060959
§ 371 (c)(1),
(2) Date: May 3, 2019

(87) PCT Pub. No.: WO2018/206081
PCT Pub. Date: Nov. 15, 2018

(65) Prior Publication Data
US 2019/0335330 A1    Oct. 31, 2019

(51) Int. Cl.
*H04M 1/68* (2006.01)
*H04W 4/80* (2018.01)
(Continued)

(52) U.S. Cl.
CPC ....... *H04W 4/80* (2018.02); *H04W 12/00514* (2019.01); *H04W 12/06* (2013.01);
(Continued)

(58) Field of Classification Search
CPC combination set(s) only.
See application file for complete search history.

(56) References Cited

U.S. PATENT DOCUMENTS

| 2018/0103363 A1* | 4/2018 | Faccin | H04L 67/14 |
| 2018/0227699 A1* | 8/2018 | Kim | H04W 8/02 |
| 2019/0335316 A1* | 10/2019 | Kim | H04W 60/00 |

OTHER PUBLICATIONS

Patent Cooperation Treaty, "International Search Report", PCT/EP2017/060959, dated Jan. 23, 2018, pp. 1-3.
(Continued)

*Primary Examiner* — Justin Y Lee
(74) *Attorney, Agent, or Firm* — Kunzler Bean & Adamson

(57) ABSTRACT

Apparatuses, methods, and systems are disclosed for authenticating with a mobile communication network. One apparatus (300) includes a processor (305), a first transceiver (325) that communicates with a mobile communication network via a first access network, and a second transceiver (330) that communicates with the mobile communication network via a second access network. The processor (305) sends (710) a request to start authentication via the second access network and receives (715) an extensible authentication protocol ("EAP") request with a first expanded type via the second access network. The processor (305) sends (720) an EAP response via the second access network, the EAP response comprising the first expanded type, a first set of parameters, and a first message. Here, the first message is a same type of message usable to establish a connection with the mobile communication network over the first access network.

24 Claims, 11 Drawing Sheets

(51) Int. Cl.
*H04W 12/00* (2021.01)
*H04W 12/06* (2021.01)
*H04W 12/08* (2021.01)
*H04W 84/12* (2009.01)

(52) U.S. Cl.
CPC .......... *H04W 12/08* (2013.01); *H04W 12/009* (2019.01); *H04W 84/12* (2013.01)

(56) References Cited

OTHER PUBLICATIONS

Patent Cooperation Treaty, "Written Opinion of the International Searching Authority", PCT/EP2017/060959, dated Jan. 23, 2018, pp. 1-6.
Huawei, Hisilicon, Comparison of Solutions of Attach for Untrusted Non-3GPP, 3FPP TSG SA WG2 Meeting #118 S2-166431, Nov. 14-18, 2016, pp. 1-2.
Motorola Mobility, Lenovo, Updates to Untrusted Non-3GPP Access, SA WG2 Meeting #119, Feb. 13-17, 2017, pp. 1-6.

* cited by examiner

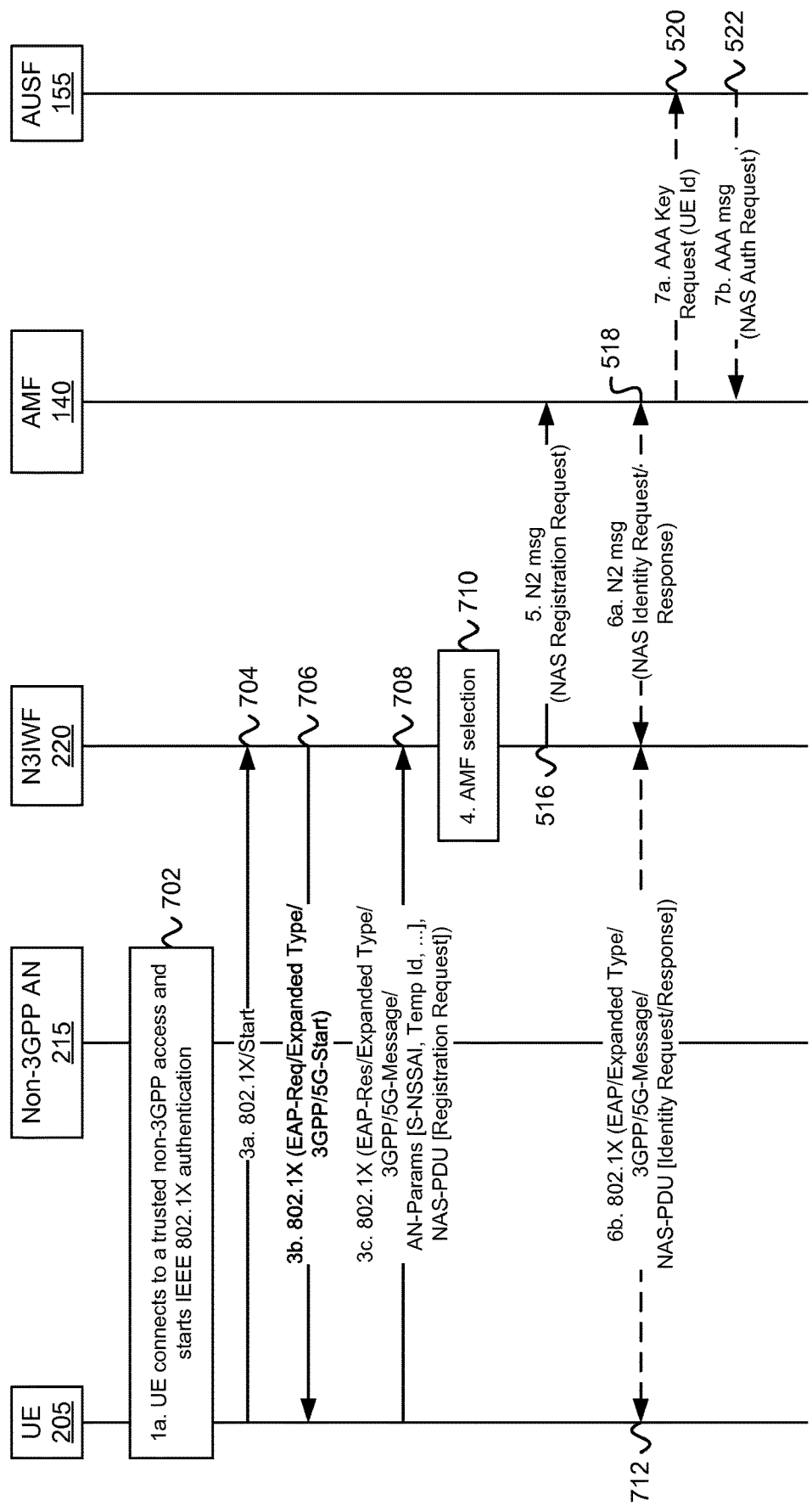

METHOD TO AUTHENTICATE WITH A MOBILE COMMUNICATION NETWORK

FIELD

The subject matter disclosed herein relates generally to wireless communications and more particularly relates to authenticating and establishing a connection with a mobile communication network over a non-3GPP access network.

BACKGROUND

The following abbreviations and acronyms are herewith defined, at least some of which are referred to within the following description.

Third Generation Partnership Project ("3GPP"), Positive-Acknowledgment ("ACK"), Access and Mobility Management Function ("AMF"), Authentication and Key Agreement ("AKA"), Authentication Server Function ("AUSF"), Common Control Plane Network Function ("CCNF"), Control Plane Function ("CPF"), Data Network Name ("DNN"), Downlink ("DL"), Enhanced Mobile Broadband ("eMBB"), Evolved Node B ("eNB"), European Telecommunications Standards Institute ("ETSI"), Extensible Authentication Protocol ("EAP"), Hybrid Automatic Repeat Request ("HARQ"), Internet Key Exchange ("IKE"), Internet Key Exchange version 2 ("IKEv2"), Internet-of-Things ("IoT"), Internet Protocol ("IP"), Long Term Evolution ("LTE"), LTA Advanced ("LTE-A"), Medium Access Control ("MAC"), Machine Type Communication ("MTC"), Massive MTC ("mMTC"), Narrowband ("NB"), Negative-Acknowledgment ("NACK") or ("NAK"), Network Function ("NF"), Network Slice Instance ("NSI"), Network Slice Selection Assistance information ("NSSAI"), Network Slice Selection Function ("NSSF"), Network Slice Selection Policy ("NSSP"), Next Generation Node B ("gNB"), Non-Access Stratum ("NAS"), Primary Cell ("PCell"), Public Land Mobile Network ("PLMN"), Quality of Service ("QoS"), Radio Access Network ("RAN"), Radio Resource Control ("RRC"), Receive ("RX"), Session Management ("SM"), Session Management Function ("SMF"), Secondary Cell ("SCell"), Single NSSAI ("S-NSSAI"), Slice Differentiator ("SD"), Slice/Service Type ("SST"), Transmission Control Protocol ("TCP"), Transmission and Reception Point ("TRP"), Transmit ("TX"), Uplink Control Information ("UCI"), User Datagram Protocol ("UDP"), User Entity/Equipment (Mobile Terminal) ("UE"), Uplink ("UL"), User Plane Function ("UPF"), Universal Mobile Telecommunications System ("UMTS"), Ultra-reliability and Low-latency Communications ("URLLC"), Wireless Local Area Network ("WLAN"), and Worldwide Interoperability for Microwave Access ("WiMAX").

In 3GPP 5G networks, a UE may connect to a non-3GPP access network; however, there is no mechanism that enables the UE to register (e.g., authenticate and connect) with a 5G core network via the non-3GPP access network.

BRIEF SUMMARY

Methods for authenticating and establishing a connection with a mobile communication network over a non-3GPP access network are disclosed. Apparatuses and systems also perform the functions of the methods. One method of the UE for authenticating and establishing a connection with a mobile communication network includes providing a first transceiver for communicating with a mobile communication network via a first access network and a second transceiver for communicating with the mobile communication network via a second access network and sending a request to start authentication via the second access network. The method includes receiving an extensible authentication protocol ("EAP") request with a first expanded type via the second access network and sending an EAP response via the second access network, the EAP response comprising the first expanded type, a first set of parameters, and a first message. Here, the first message is a same type of message usable to establish a connection with the mobile communication network over the first access network.

One method of an interworking function for authenticating and establishing a connection with a mobile communication network includes receiving a request from the remote unit to start authentication via a first access network (e.g., a non-3GPP access network) and sending an EAP request with a first expanded type to the remote unit. The method also includes receiving an EAP response via the first access network, the EAP response comprising the first expanded type, a first set of parameters, and a first message. Here, the first message is a same type of message usable to establish a connection with the mobile communication network over another access network (e.g., a 3GPP access network) that uses different communication protocols than the first access network.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7A is a block diagram illustrating one embodiment of a network procedure for using EAP to authenticate and establish a NAS connection with a mobile communication network over a trusted non-3GPP access network;

DETAILED DESCRIPTION

Figure 1:
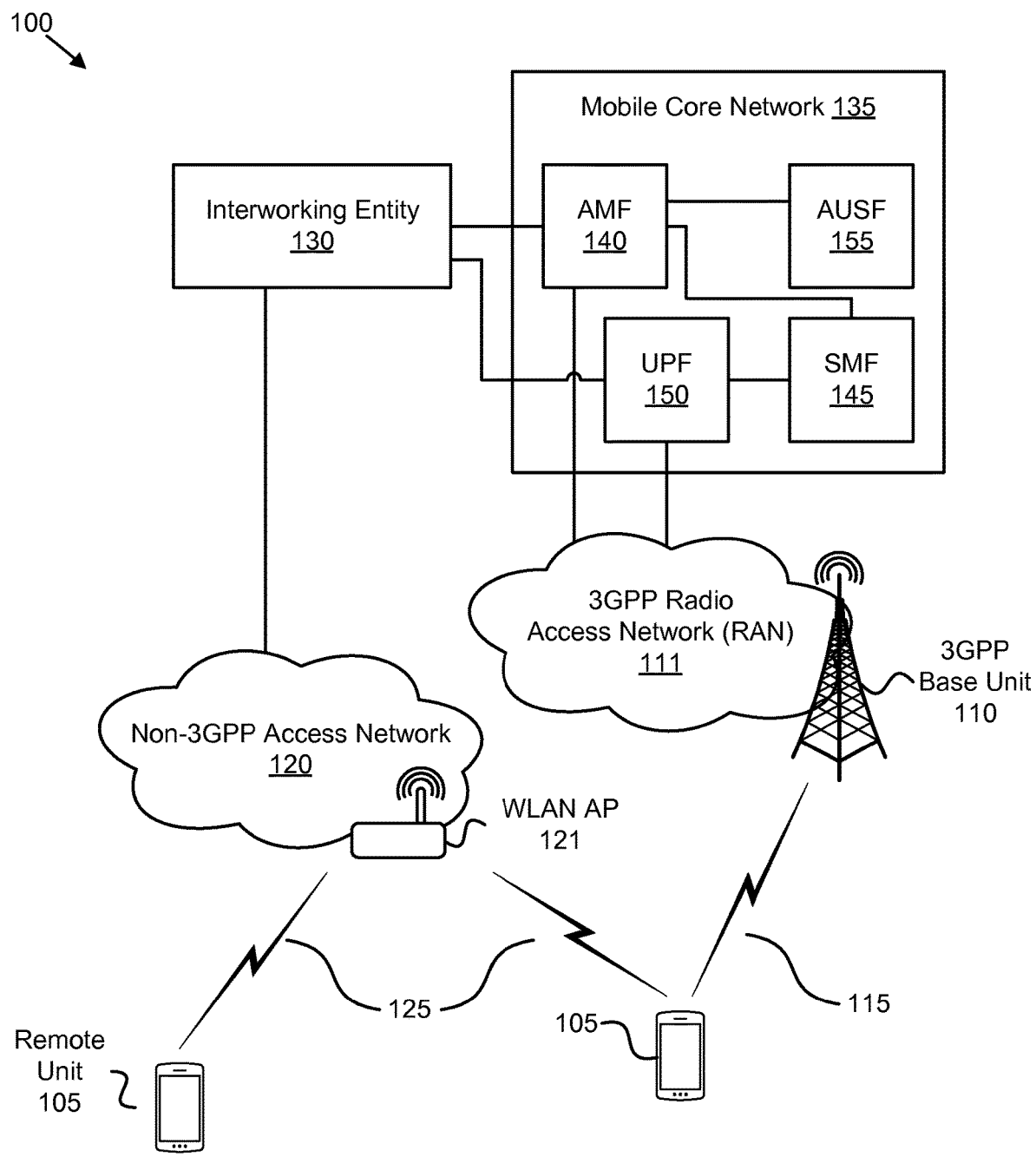
FIG. 1 is a schematic block diagram illustrating one embodiment of a wireless communication system for authenticating and establishing a connection with a mobile communication network.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In order to enable a UE to register (e.g., connect) with a 5G core network via the non-3GPP access network the present disclosure describes systems, methods, and apparatus that use a new EAP authentication method, referred to herein as the "EAP-5G" procedure, which allows the UE to register with the 5G core network over the non-3GPP access network by reusing the same message types (e.g., NAS signaling) used to register the UE with the 5G core network over a 3GPP (radio) access network. The EAP-5G procedure uses EAP Expanded packets specific to 3GPP. Here, a vendor-ID of the EAP Expanded packets points to 3GPP, while the vendor type identifies the EAP-5G procedure and the vendor data contains messages defined for the EAP-5G procedure.

FIG. 1 depicts a wireless communication system 100 for authenticating and establishing a connection with a mobile communication network, e.g., over a non-3GPP access network, according to embodiments of the disclosure. In one embodiment, the wireless communication system 100 includes a plurality remote units 105, at least one 3GPP base unit 110, a 3GPP radio access network ("RAN") 111 that includes at least one 3GPP base unit 110, 3GPP communication links 115, at least one non-3GPP access network ("AN") 120 (here, the depicted non-3GPP AN 120 includes at least one WLAN access point ("AP") 121), and non-3GPP communication links 125. Even though a specific number of remote units 105, non-3GPP ANs 120, WLAN APs 121, WLAN 3GPP communication links 115, mobile radio access networks 120, 3GPP base units 110, 3GPP RANs 111, 3GPP communication links 115, non-3GPP ANs, WLAN APs 121, and non-3GPP communication links 125 are depicted in FIG. 1, one of skill in the art will recognize that any number of remote units 105, non-3GPP ANs 120, WLAN APs 121, WLAN 3GPP communication links 115, mobile radio access networks 120, 3GPP base units 110, 3GPP RANs 111, 3GPP communication links 115, non-3GPP ANs, WLAN APs 121, and non-3GPP communication links 125 may be included in the wireless communication system 100.

In one implementation, the wireless communication system 100 is compliant with the 5G system or subsequent cellular network system specified in the 3GPP specifications. More generally, however, the wireless communication system 100 may implement some other open or proprietary communication network, for example, LTE, LTE-A advanced, or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the 3GPP base units 110 via uplink ("UL") and downlink ("DL") communication signals. Furthermore, the UL and DL communication signals may be carried over the 3GPP communication links 115. Similarly, the remote units 105 may communicate with one or more WLAN APs 121 in the non-3GPP AN 120 via UL and DL communication signals carried over the non-3GPP communication links 125. Note that the 3GPP base units 110 and WLAN APs 121 use different communication standards and the 3GPP communication links 115 and non-3GPP communication links 125 carry messages that follow different communication protocols, e.g., on lower layers such as MAC and PHY layers.

The 3GPP base units 110 may be distributed over a geographic region. In certain embodiments, a 3GPP base unit 110 may also be referred to as an access terminal, a base, a base station, a Node-B, an eNB, a gNB, a Home Node-B, a relay node, a femtocell, a device, or by any other terminology used in the art. The 3GPP base units 110 are part of a 3GPP radio access network ("RAN") 111 that may include one or more controllers communicably coupled to one or more corresponding 3GPP base units 110. These and other elements of radio access network are not illustrated but are well known generally by those having ordinary skill in the art. The 3GPP base units 110 connect to the mobile core network 135 via the 3GPP RAN 111.

The 3GPP base units 110 may serve a number of remote units 105 within a serving area, for example, a cell or a cell sector via a wireless communication link. The 3GPP base units 110 may communicate directly with one or more of the remote units 105 via communication signals. Generally, the 3GPP base units 110 transmit DL communication signals to serve the remote units 105 in the time, frequency, and/or spatial domain. Furthermore, the DL communication signals may be carried over the 3GPP communication links 115. The 3GPP communication links 115 may be any suitable carrier in licensed or unlicensed radio spectrum. The 3GPP communication links 115 facilitate communication between one or more of the remote units 105 and/or one or more of the 3GPP base units 110.

The non-3GPP ANs 120 may be distributed over a geographic region. As depicted in FIG. 1, a non-3GPP AN 120 connects to a mobile core network 135 via an interworking function 130. In certain embodiments, a non-3GPP AN 120 may be controlled by an operator of the mobile core network 135 and may have direct access to the mobile core network 135. Such a non-3GPP AN deployment is referred to as a "trusted non-3GPP AN." A non-3GPP AN 120 is considered as "trusted" when it is operated by the 3GPP operator and supports certain security features, such as 3GPP-based authentication and strong air-interface encryption. In some embodiments, the interworking function 130 may be contained within (e.g., co-sited with) a trusted non-3GPP AN. In one embodiment, the interworking function 130 may be a component of a WLAN AP 121 or other non-3GPP access point in the trusted non-3GPP AN 120.

In other embodiments, a non-3GPP AN 120 is not controlled by the operator of the mobile core network 135 and thus does not have direct access to the mobile core network 135. Such non-3GPP access network deployments are referred to as "untrusted" non-3GPP ANs. For example, public hotspots deployed in malls, coffee shops, and other public areas are considered as untrusted. Here, the untrusted non-3GPP ANs 120 rely on a data network, such as the Internet, to connect to the mobile core network 135. The mobile core network 135 may provide services to a remote unit 105 via the non-3GPP AN 120, as described in greater detail herein.

The WLAN AP 121 is an example of a non-3GPP access point and allows a remote unit 105 to connect to (e.g., access) a non-3GPP AN 120. Each WLAN AP 121 may serve a number of remote units 105 with a serving area. Typically, a serving area of the WLAN AP 121 is smaller than the serving area of a 3GPP base unit 110. The WLAN APs 121 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 125. A WLAN AP 121 may communicate using unlicensed radio spectrum.

In one embodiment, the mobile core network 135 is a 5G core ("5GC"), which may be coupled to a data network, like the Internet and private data networks, among other data networks. In some embodiments, the remote units 105 communicate with a remote host via a network connection with the mobile core network 135. Each mobile core network 135 belongs to a single public land mobile network ("PLMN"). The present disclosure is not intended to be limited to the implementation of any particular wireless communication system architecture or protocol.

The mobile core network 135 includes several network functions ("NFs"). In certain embodiments, the mobile core network may support one or more network slices. As depicted, the mobile core network 135 includes at least one access and mobility management function ("AMF") 140, at least one session management function ("SMF") 145, at least one user plane function ("UPF") 150, and at least one authentication server function ("AUSF") 155. Although a specific number of NFs are depicted in FIG. 1, one of skill in the art will recognize that any number of NFs may be included in the mobile core network 135.

The AMF 140 and SMF 145 are examples of control plane network functions of the mobile core network 135. Control plane network functions provide services such as UE registration, UE connection management, UE mobility management, data session management, and the like. The UPF 150 provides user plane (e.g., data) services to the remote units 105. For example, a data connection between the remote unit 105 and a remote host is managed by a UPF 150. The AUSF 155 authenticates credentials of a remote unit 105 seeking services in the mobile core network 135. The AUSF 155 may support multiple authentication methods, including NAS authentication.

Although depicted as outside the mobile core network 135, in some embodiments the interworking entity 130 may be located within the mobile core network 135. For example, an instance of the interworking function 130 located within the mobile core network 135 may provide interworking functions to an untrusted non-3GPP AN 120. The interworking function 130 provides interworking between a non-3GPP AN 120 and the mobile core network 135, converting non-3GPP access network protocols to messages sent over the N2 and N3 interfaces. Here, the interworking function 130 may perform AAA functions for the non-3GPP AN 120 convert 3GPP authentication messages used by the mobile core network 135 into authentication messages (e.g., EAP messages) used by the non-3GPP AN 120.

Figure 2:
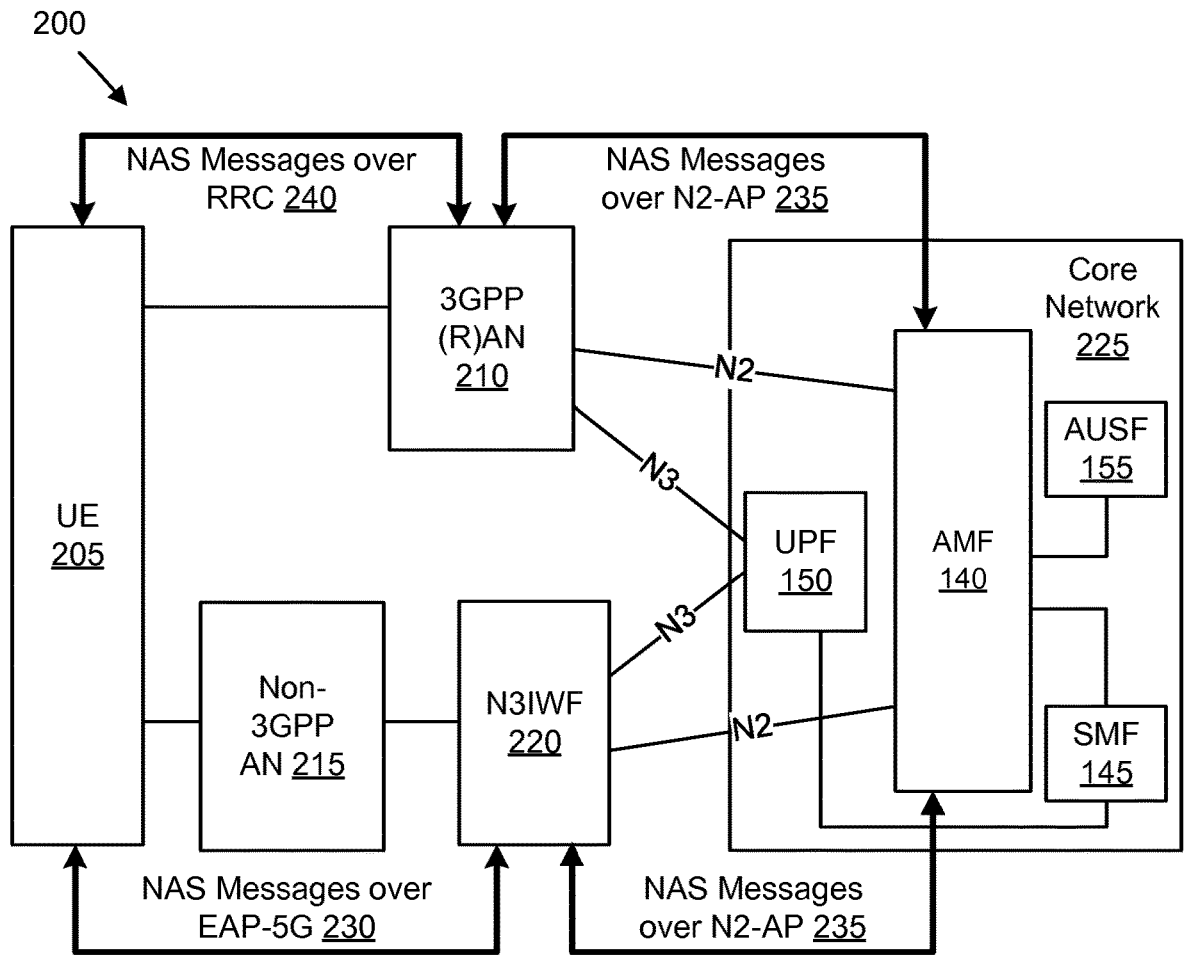
FIG. 2 is a block diagram illustrating one embodiment of a network architecture for authenticating and establishing a NAS connection with a mobile communication network.

FIG. 2 depicts a network architecture 200 used for authenticating and establishing a NAS connection with a mobile communication network, e.g., over a non-3GPP access network, according to embodiments of the disclosure. The network architecture 200 may be a simplified embodiment of the wireless communication system 100. As depicted, the network architecture 200 includes a UE 205, a 3GPP (R)AN 210, a non-3GPP AN 215, a non-3GPP interworking function ("N3IWF") 220, and a core network 225. As depicted, the UE 205 is capable of accessing the core network 225 using one or both of the 3GPP (R)AN 210 and the non-3GPP AN 215. Here, the core network 225 includes an AMF 140, a UPF 145, and a AUSF 150. Both the 3GPP (R)AN 210 and the N3IWF 220 communicate with the AMF 140 using a "N2" interface and with the UPF 150 using a "N3" interface.

The UE 205 may be one embodiment of a remote unit 105, the 3GPP (R)AN 210 may be one embodiment of a 3GPP RAN 111, and the non-3GPP AN 215 may be one embodiment of a non-3GPP AN 120, as described above. The core network 225 may be one embodiment of the mobile core network 135, discussed above. Additionally, the N3IWF 220 may be one embodiment of the interworking function 130, discussed above. Here, the N3IWF 220 is depicted as being located outside the non-3GPP AN 215 and the core network 225. In other embodiments, the N3IWF 220 may be co-located with the non-3GPP AN 215 (e.g., if the non-3GPP AN 215 is a trusted non-3GPP AN 215) or located within the core network 225.

In the network architecture 200, the UE 205 may establish a connection with the core network 225 via either the 3GPP (R)AN 210 or the non-3GPP AN 215. When using the 3GPP (R)AN 210, the UE 205 sends/receives NAS messages over RRC 240 to the 3GPP (R)AN 210 and the 3GPP (R)AN 210 sends/receives corresponding NAS messages over N2-AP 235. Additionally, when using the non-3GPP AN 215, the UE 205 sends EAP messages (e.g., NAS messages over EAP-5G 230) towards the core network 225. The N3IWF 220 converts the NAS messages over EAP-5G 230 into NAS messages over N2-AP 235. Using the NAS messages encapsulated in EAP-5G packets, the UE 205 authenticates with the core network 225. The result of successful authentication is the establishment of a NAS connection between the UE 205 and the core network 225 via the non-3GPP AN 215.

Here, the NAS messages over N2-AP 235 sent by the N3IWF 220 to the core network 225 have the same form (e.g., are of the same type) as the NAS messages over 3GPP 240. Thus, from the perspective of the core network 225 (including the AMF 140), the same types of messages (e.g., NAS messages over N2-AP 235) are received from the 3GPP (R)AN 210 and from the N3IWF 220 (but not necessarily with the same values). Here, the core network 225 can interpret and operate on the NAS messages over N2-AP 235 received from the N3IWF 220 in the same manner it interprets and operates on the NAS messages over N2-AP 235 received from the 3GPP (R)AN 210.

Figure 3:
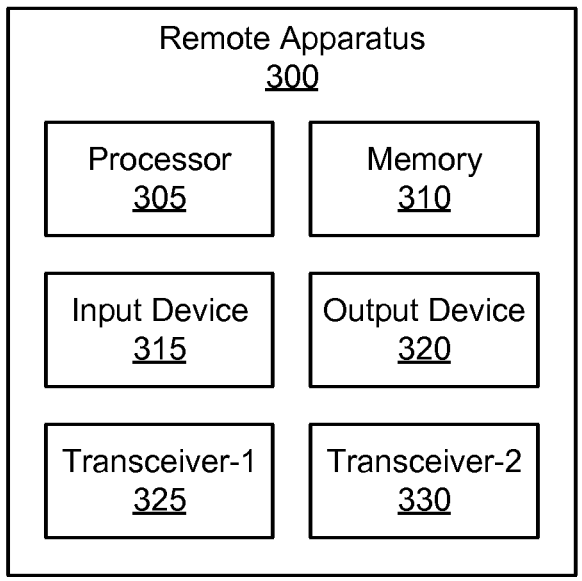
FIG. 3 is a schematic block diagram illustrating one embodiment of a remote apparatus for authenticating and establishing a NAS connection with a mobile communication network over a non-3GPP access network.

FIG. 3 depicts one embodiment of a remote apparatus 300 that may be used for authenticating and establishing a connection with a mobile communication network, e.g., over a non-3GPP access network, according to embodiments of the disclosure. The remote apparatus 300 may be one embodiment of the remote unit 105 and/or the UE 205. Furthermore, the remote apparatus 300 includes a processor 305, a memory 310, an input device 315, a display 320, a first transceiver 325, and a second transceiver 330. In some embodiments, the input device 315 and the display 320 are combined into a single device, such as a touchscreen. In certain embodiments, the remote unit 105 may not include any input device 315 and/or display 320.

The first transceiver 325 ("transceiver-1") communicates with a mobile communication network (e.g., a core network) over a first access network, while the second transceiver 330 ("transceiver-2") communicates with the mobile communication network over a second access network. The first and second access networks each facilitate communication between the mobile core network 135 and the remote apparatus 300. Here, the first access network uses different communication protocols than the second access network. In one embodiment, the first access network is the 3GPP RAN 111 or the 3GPP (R)AN 210 and the second access network is the non-3GPP AN 120, non-3GPP AN 215, or other non-cellular access network. Here, the first access network may use a first communication (e.g., media access control ("MAC") layer and/or physical ("PHY") layer) protocol, such as the 3GPP New Radio ("NR") protocol and the second access network may use a second communication (e.g., MAC and/or PHY layer) protocol, such as the IEEE 802.11 family of protocols. In other embodiments, the first access network and second access network may be other types of access networks, the first access network being a different type of access network (and supporting a different communication protocol) than the second access network. Each transceiver 325, 330 may include at least one transmitter and at least one receiver. Additionally, the transceivers 325, 330 may each support at least one network interface used to communicate with the access network and/or core network, such as an "Uu" interface used to communicate with a 3GPP base unit 110 or the 5G (R)AN 210.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the display 320, the first transceiver 325, and the second transceiver 330.

In some embodiments, the processor 305 sends a request to start authentication via the second access network. In one embodiment, the processor 305 sends a request to connect to a mobile communication network over an untrusted non-3GPP access network and start authentication via the untrusted non-3GPP access network. In another embodiment, the processor 305 sends a request to start authentication via a trusted non-3GPP access network.

In certain embodiments, the second access network is a non-3GPP access network, such as a WLAN or WI-FI® hotspot. In one embodiment, the connection request is embedded within an IKEv2 message, such as an IKE Authentication ("IKE_AUTH") request. The connection request identifies the remote apparatus 300, e.g., using a permanent or temporary UE identifier. The processor 305 may send the request to an interworking function, such as the N3IWF 220.

In response to the connection request, the processor 305 may receive, via the second (e.g., non-3GPP) access network, an extensible authentication protocol ("EAP") request with a first expanded type. Here, the first expanded type may be a 3GPP-specific type, such as a EAP-5G expanded type. This indicates to processor 305 to start a specific authentication method that requires the use of NAS message inside EAP-5G messages. In one embodiment, the EAP request with the first expanded type corresponds to a 5G-Start message. The EAP request may also be embedded within an IKEv2 message, such as an IKE-AUTH response.

In response to the EAP request, the processor 305 may send (via the second access network) an EAP response that contains the first expanded type, a first set of parameters, and a first message. Here, the first message is a same type of message usable to establish a connection with the mobile communication network over the first access network. For example, the first message may be a non-access stratum ("NAS") registration request. Where the mobile communication network is a 5G network, the first message may be a 5G-NAS registration request. Here, the result of successful authentication is the establishment of a NAS connection between the remote apparatus 300 and the 5G core via the non-3GPP access. Note that the same NAS message is sent to the mobile communication network (e.g., to an AMF in the core network) either (a) encapsulated in RRC and N2-AP or (b) encapsulated in EAP-5G and N2-AP, as discussed above. Accordingly, the same type of NAS connection is established over the non-3GPP access network as is commonly established over a 3GPP access network.

In certain embodiments, the first set of parameters includes 3GPP access network parameters ("AN-Params") to be used by the interworking function to select an AMF within the mobile core network 135. Here, the AN-Params may include one or more S-NSSAI (slicing info), a DNN (Data Network Name), an SSC mode (Session and Service Continuity), and the like. The interworking function then forwards the first message to the selected AMF. In some embodiments, the processor 305 further receives one or more additional EAP requests and sends an equal number of EAP responses. Here, each of the additional EAP requests and responses encapsulates at least one NAS message. In this manner, the remote apparatus 300 may be identified and authenticated using NAS messages. Further, the processor 305 establishes a NAS connection with the mobile communication network via the additional EAP requests and responses.

In certain embodiments, the processor 305 may establish a secure IPsec connection with the interworking function (e.g., the N3IWF 220). The processor 305 then exchanges NAS messages with the mobile communication network via the secure IPsec connection. The processor 305 may establish the secure IP sec connection in response to completing the authentication procedure.

In some embodiments, the processor 305 may determine that it does not support the first expanded type (e.g., does not support the EAP-5G and 5G-NAS protocols). Here, the processor 305 sends the EAP response via the second access network by sending an EAP response that includes the first expanded type and a list of authentication methods supported by the apparatus for authenticating with the mobile communication network via the second access network. In such embodiments, the processor 305 and perform authentication procedure with the mobile communication network using one of the supported authentication methods.

In some embodiments, the processor 305 determines the remote apparatus 300 supports the first expanded type (e.g., supports the EAP-5G protocol), but does not support an expected 5G-NAS message type (e.g., does not support the 5G-NAS protocol associated with the expected message type). Here, the process the 305 sends the EAP response via the second access network by sending an EAP response (e.g. an EAP "5G-Info" message) that includes the first expanded type and one or more additional parameters usable by the interworking function. The interworking function may then generate a message of the expected message type (e.g., an 5G-NAS registration request message) on behalf of the remote apparatus 300. In certain embodiments, the interworking function includes an (optional) indication in the 5G-NAS message that the message is created by the interworking function on behalf of the remote apparatus 300.

Where the remote apparatus 300 supports the EAP-5G protocol, but not the 5G-NAS protocol (e.g., does not support the 5G-NAS protocol associated with an expected message type), the processor 305 may send an EAP information message (e.g., EAP-5G-Info message) to the interworking function that includes additional parameters (e.g., AN-Params) to aid the interworking function, e.g., in selecting an AMF in the 5G core network.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to authenticating with a mobile communication network, for example storing AN-Params, UE IDs, security keys, and the like. In some embodiments, the memory 310 also stores program code and related data, such as an operating system or other controller algorithms operating on the remote unit 105 and one or more software applications.

The input device 315, in one embodiment, may include any known computer input device including a touch panel, a button, a keyboard, a stylus, a microphone, or the like. In some embodiments, the input device 315 may be integrated with the display 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The display 320, in one embodiment, may include any known electronically controllable display or display device. The display 320 may be designed to output visual, audible, and/or haptic signals. In some embodiments, the display 320 includes an electronic display capable of outputting visual data to a user. For example, the display 320 may include, but is not limited to, an LCD display, an LED display, an OLED display, a projector, or similar display device capable of outputting images, text, or the like to a user. As another, non-limiting, example, the display 320 may include a wearable display such as a smart watch, smart glasses, a heads-up display, or the like. Further, the display 320 may be a component of a smart phone, a personal digital assistant, a television, a table computer, a notebook (laptop) computer, a personal computer, a vehicle dashboard, or the like.

In certain embodiments, the display 320 includes one or more speakers for producing sound. For example, the display 320 may produce an audible alert or notification (e.g., a beep or chime). In some embodiments, the display 320 includes one or more haptic devices for producing vibrations, motion, or other haptic feedback. In some embodiments, all or portions of the display 320 may be integrated with the input device 315. For example, the input device 315 and display 320 may form a touchscreen or similar touch-sensitive display. In other embodiments, the display 320 may be located near the input device 315.

The transceiver 325 communicates with a mobile communication network via a first access network, while the second transceiver 330 communicates with the mobile communication network via a second access network. As discussed above, the first access network may be an embodiment of the 3GPP RAN 111 and/or the 3GPP (R)AN 210, while the second access network is an embodiment of the non-3GPP access network 120 and/or the non-3GPP AN 215. In other embodiments, the first access network and second access network may be other types of access networks, the first access network being a different type of access network than the second.

The transceivers 325 and 330 operate under the control of the processor 305 to transmit messages, data, and other signals and also to receive messages, data, and other signals. For example, the processor 305 may selectively activate one or both of the transceivers 325, 330 (or portions thereof) at particular times in order to send and receive messages. The transceiver 325 may include one or more transmitters and one or more receivers for communicating over the first access network. Similarly, the transceiver 330 may include one or more transmitters and one or more receivers for communicating over the second access network. As discussed above, the first transceiver 325 and the second transceiver 330 may support one or more the network interfaces for communicating with the mobile communication network.

Figure 4:
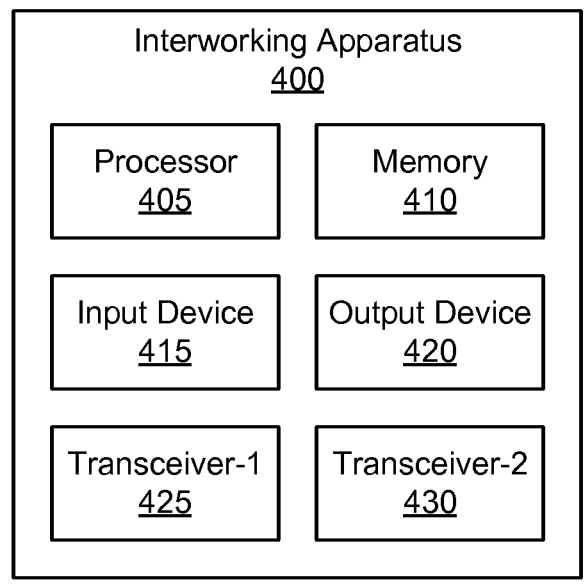
FIG. 4 is a schematic block diagram illustrating one embodiment of an interworking function apparatus for authenticating and establishing a NAS connection with to a mobile communication network over a non-3GPP access network.

FIG. 4 depicts one embodiment of an interworking apparatus 400 that may be used for authenticating a remote unit and establishing a connection with a mobile communication network, e.g., over a non-3GPP access network, according to embodiments of the disclosure. The interworking apparatus 400 may be one embodiment of the interworking function 130 and/or the N3IWF 220. Furthermore, the interworking apparatus 400 includes a processor 405, a memory 410, an input device 415, a display 420, a first transceiver 425, and a second transceiver 430. In some embodiments, the input device 415 and the display 420 are combined into a single device, such as a touchscreen. In certain embodiments, the interworking apparatus 400 may not include any input device 415 and/or display 420.

The first transceiver 425 ("transceiver-1") allows the interworking apparatus 400 to communicate with a remote unit 105 and/or UE 205 via a non-3GPP access network. The second transceiver 430 ("transceiver -2") allows the interworking apparatus 400 to communicate with other network elements within a mobile communication network, such as the AMF 140 and/or UPF 145. Each of the first transceiver 425 and second transceiver 430 may include at least one transmitter and at least one receiver. Additionally, the transceivers 425, 430 may each support at least one network interface such as an "N2" interface used to communicate with an AMF and an "N3" interface used to communicate with a SMF.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the display 420, the first transceiver 425, and the second transmitter 430.

In some embodiments, the processor 405 receives a request from the remote unit to start authentication via the first access network. In certain embodiments, the first access network is a non-3GPP access network, such as a WLAN or a WI-FI® hotspot. In one embodiment, the connection request identifies the remote unit, e.g., using a permanent or temporary UE identifier. In some embodiments, the processor 405 receives a request to connect to a mobile communication network and start authentication via an untrusted non-3GPP access network. In another embodiment, the processor 405 receives a request to start authentication via a trusted non-3GPP access network.

In response to the connection request, the processor 405 may send an extensible authentication protocol ("EAP") request with a first expanded type to the remote unit. Here, the first expanded type it may be a 3GPP specific type, such as a EAP-5G expanded type. In certain embodiments, the EAP request may be embodied an IKEv2 message, such as an IKE Authentication ("IKE_AUTH") response. In certain embodiments, the request from the remote unit to authenticate with the mobile communication network includes an indication that the remote unit supports EAP messaging using the first expanded type. Here, the processor 405 sends the EAP request with the first expanded type occurs in response to the indication.

In certain embodiments, the processor 405 may receive an EAP response via the first access network (e.g., a non-3GPP access network). Here, the EAP response may include the first expanded type (e.g., EAP-5G expanded type), a first set of parameters (e.g., AN-Params), and a first message. In such embodiments, the first message is a same type of message usable to establish a connection with the mobile communication network over another access network (e.g., a 3GPP access network) that uses different communication protocols than the first access network. In one embodiment, the first message is a non-access stratum ("NAS") registration request, such as a 5G-NAS registration request usable to establish a connection over a 3GPP access network. Here, the result of successful authentication is the establishment of a NAS connection between the remote unit and the 5G core network via the non-3GPP access. Note that the same NAS message is sent to the mobile communication network (e.g., to an AMF in the core network) either (a) encapsulated in RRC and N2-AP or (b) encapsulated in EAP-5G and N2-AP, as discussed above. Accordingly, the same type of NAS connection is established over the non-3GPP access network as is commonly established over a 3GPP access network.

In certain embodiments, the processor 405 sends one or more additional EAP requests and receives an equal number of EAP responses, wherein each of the additional EAP requests and responses encapsulates at least one NAS message. In some embodiments, the processor 405 further establishes a secure IPsec connection with the remote unit. Thereafter, the processor 405 may relay NAS messages between the remote unit and the mobile communication network via the secure IPsec connection. In further embodiments, the remote unit establishes a NAS connection with the mobile communication network via the additional EAP requests and responses.

In some embodiments, the processor 405 receives an indication that the first expanded type (e.g., EAP-5G expanded type) is not supported by the remote unit. Here, receiving the EAP response via the first access network may include receiving an EAP response including the first expanded type and a list of authentication methods supported by the remote unit for authenticating with the mobile communication network via the second access network. In response, the processor 405 may forward list of authentication methods supported by the remote unit to the mobile communication network.

In certain embodiments, the processor 405 may send a NAS message to the mobile communication network on behalf of the remote unit and (optionally) an indication that the NAS message is created by the apparatus on behalf of the UE. The NAS message may be one or more of an NAS registration request, and NAS registration request that includes a session establishment request, and an NAS service request. In one embodiment, the processor 405 may send an EAP request without the first expanded type to the remote unit.

In some embodiments, the processor 405 receives an indication that an expected message type (e.g., 5G-NAS message type) is not supported by the remote unit. For example, the remote unit may support the EAP-5G protocol (e.g., associated with the EAP-5G expanded type), but does not support the 5G-NAS protocol associated with the expected message type. Here, the EAP response may include the first expanded type (e.g., EAP-5G expanded type) and one or more additional parameters (e.g., AN-Params). Here, the processor generates a message of the expected message type (e.g., a 5G-NAS message) on behalf of the remote unit. In certain embodiments, the processor 405 includes in the 5G-NAS message an indication that the message of the expected message type (e.g., 5G-NAS message type) is created by the interworking apparatus 400 on behalf of the remote unit.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to authenticating with a mobile communication network, such as message contents, UE AN-Params, and the like. In certain embodiments, the memory 410 also stores program code and related data, such as an operating system or other controller algorithms operating on the interworking apparatus 400 and one or more software applications.

The input device 415, in one embodiment, may include any known computer input device including a touch panel, a button, a keyboard, a stylus, a microphone, or the like. In some embodiments, the input device 415 may be integrated with the display 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The display 420, in one embodiment, may include any known electronically controllable display or display device. The display 420 may be designed to output visual, audible, and/or haptic signals. In some embodiments, the display 420 includes an electronic display capable of outputting visual data to a user. For example, the display 420 may include, but is not limited to, an LCD display, an LED display, an OLED display, a projector, or similar display device capable of outputting images, text, or the like to a user. As another, non-limiting, example, the display 420 may include a wearable display such as a smart watch, smart glasses, a heads-up display, or the like. Further, the display 420 may be a component of a smart phone, a personal digital assistant, a television, a table computer, a notebook (laptop) computer, a personal computer, a vehicle dashboard, or the like.

In certain embodiments, the display 420 includes one or more speakers for producing sound. For example, the display 420 may produce an audible alert or notification (e.g., a beep or chime). In some embodiments, the display 420 includes one or more haptic devices for producing vibrations, motion, or other haptic feedback. In some embodiments, all or portions of the display 420 may be integrated with the input device 415. For example, the input device 415 and display 420 may form a touchscreen or similar touch-sensitive display. In other embodiments, the display 420 may be located near the input device 415.

The transceiver 425 communicates with a remote unit or UE, while the second transceiver 430 communicates with NFs in a mobile communication network. The transceivers 425 and 430 operate under the control of the processor 405 to transmit messages, data, and other signals and also to receive messages, data, and other signals. For example, the processor 405 may selectively activate one or both of the transceivers 425, 430 (or portions thereof) at particular times in order to send and receive messages. The first transceiver 425 may include one or more transmitters and one or more receivers for communicating over the first access network. Similarly, the second transceiver 430 may include one or more transmitters and one or more receivers for communicating over the second access network. As discussed above, the first transceiver 425 and the second transceiver 430 may support one or more the network interfaces for communicating with the mobile communication network.

Figure 5A:
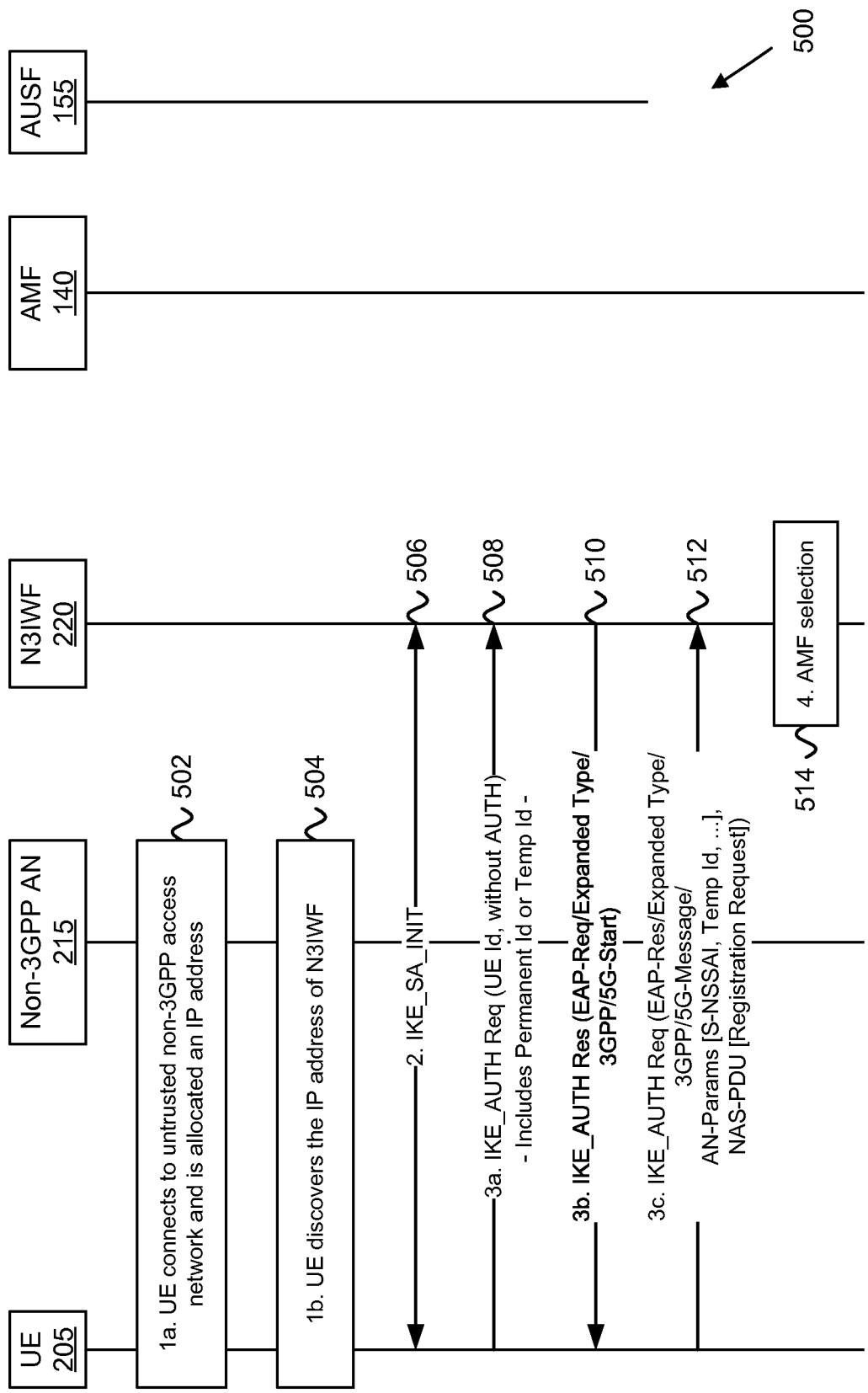
FIG. 5A is a block diagram illustrating one embodiment of a network procedure for using EAP to authenticate and establish a NAS connection with a mobile communication network over an untrusted non-3GPP access network.
Figure 5B:
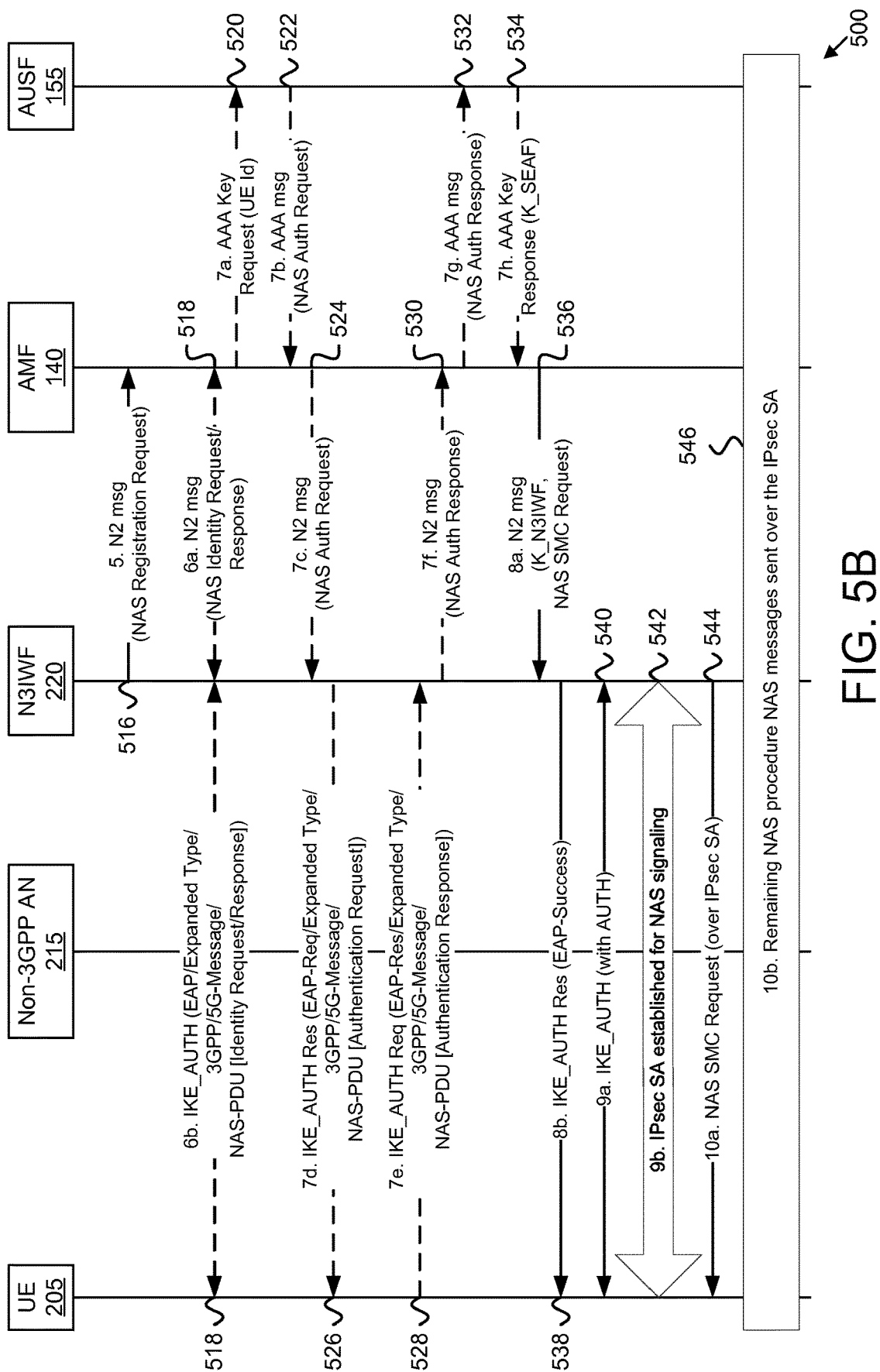
FIG. 5B is a continuation of the network procedure illustrated in FIG. 5A.

FIGS. 5A and 5B depict a network procedure 500 for using EAP to connect to, authenticate with, and establish a NAS connection with a mobile communication network, e.g., over an untrusted non-3GPP access network, according to embodiments of the disclosure. The network procedure 500 begins in FIG. 5A and continues in FIG. 5B. The network procedure 500 involves the UE 205, the non-3GPP AN 215, the N3IWF 220 G (R)AN 210, the AMF 140, and the AUSF 155. Here, the result of successful authentication is the establishment of a NAS connection between the UE 205 and the 5G core network via the non-3GPP AN 215.

The network procedure 500 depicts how the new EAP-5G procedure disclosed herein is used to enable a UE 205 to register to a 5G core network (e.g., the core network 225) via untrusted non-3GPP access, such as the non-3GPP AN 215. Note that the new EAP-5G procedure runs between the UE 205 and the N3IWF 220 and enables the exchange of NAS messages and other information between the UE 205 and N3IWF 220 during the authentication procedure.

The network procedure 500 begins at FIG. 5A with the UE 205 connecting to the non-3GPP AN 215 and retrieving an IP from this network (see block 502). In doing so, the UE 205 obtains connectivity to an external network, such as the Internet. Here, the non-3GPP AN 215 is an untrusted non-3GPP access network, such as a public WI-FI® hotspot or other public network. The UE 205 subsequently decides to register with a 5G core network (e.g., the core network 225) in a certain PLMN and discovers the IP address of an interworking function in this PLMN, here the N3IWF 220 (see block 504). Here, the UE 205 may perform a DNS discovery procedure to discover the IP address of the N3IWF 220.

After discovering the N3IWF 220, the UE 220 begins establishment of an IPsec connection (e.g., IPsec tunnel) with the N3IWF 220, here using the Internet Key Exchange version 2 ("IKEv2") protocol IKE_SA_INIT exchange (see signaling 506). Note that an IKE "exchange" consists of a pair of messages: a request and a response. Here, the IKE_SA_INIT exchange establishes security parameters for subsequent IKEv2 exchanges.

The UE 205 sends an IKE_AUTH request that includes its permanent or temporary identity (see signaling 508). In certain embodiments, the permanent or temporary identity may be assigned to UE 205 by the 5G core network during a previous registration procedure. Here, the IKE_AUTH request contains the UE identity, but is sent without an AUTH value.

In some embodiments, the IKE_AUTH request from the UE 205 includes an indication of whether the UE 205 supports the EAP method with the first expanded type (e.g., the EAP-5G procedure). If this indication is missing (or a negative indication is included), then the N3IWF 220 does not use the EAP method with the first expanded type (EAP-5G) but it uses a legacy EAP method (i.e. an EAP method without the first expanded type). In the network procedure 500, the UE 205 supports the EAP method with the first expanded type (e.g., the EAP-5G protocol and its associated expanded type) and further supports the 5G-NAS protocol (and messages of an expected 5G-NAS type).

The N3IWF 220 sends a EAP request message containing a 5G-Start message to inform the UE 205 that it should start a NAS procedure (e.g., 5G-NAS) for establishing connectivity with the 5G core network (see signaling 510). Note that the 5G-Start message uses a first EAP expanded type (e.g., that corresponds to the EAP-5G procedure described herein). The UE 205 responds with a 5G-Message (e.g., embedded in a EAP response message) which contains Access Network parameters ("AN-Params") and a NAS Registration Request message (see signaling 512). Note that the 5G-Message also uses the first EAP expanded type (e.g., EAP-5G expanded type associated with the EAP-5G protocol). The AN-Params include information for the N3IWF 220 for routing the NAS Registration Request message to the appropriate AMF (here the AMF 140) in the 5G core network. For example, the AN-Params may include one or more S-NSSAI (slicing info), a DNN (Data Network Name), a SSC mode (Session and Service Continuity), and the like.

While FIG. 5A depicts a NAS Registration Request (specifically a NAS-PDU Registration Request) being sent by the UE 205 to the N3IWF, in other embodiments another appropriate NAS message could be used, such as a NAS Service Request. In the depicted embodiment, the NAS Registration Request is embodied in a "5G-Message" format message when transferred between the UE 205 and the N3IWF 220. In other embodiments, the NAS Registration Request message may be embodied in a "5G-Challenge" format message when transferred between the UE 205 and the N3IWF 220. In response to the 5G-Message, the N3IWF 220 selects an AMF to forward the NAS Registration Request to by using the AN-Params provided by the UE (see block 514). Here, the N3IWF 220 selects the AMF 140 in the PLMN.

Referring now to FIG. 5B, the N3IWF 220 forwards the NAS Registration Request message to the selected AMF 140 (see signaling 516). Here, the N3IWF 220 generates an N2 message that contains the NAS Registration Request. Where, the 5G-Message received from the UE 205 contains a NAS Service Request (or other NAS message), the N3IWF 220 forwards the NAS Service Request message (or other NAS message) to the selected AMF.

In certain embodiments, the AMF 140 may decide to request a UE identity of the UE 205 (e.g. to detect stolen UEs) by using sending a NAS Identity Request message to UE 205 via the N3IWF 220 (see signaling 518). Here, the AMF 140 sends a N2 message containing the NAS Identity Request and the N3IWF 220 converts the N2 message into an EAP-5G message. Similarly, the UE 205 sends an EAP-5G message containing the NAS Identity Response and the N3IWF 220 converts the EAP-5G message into an N2 message. The NAS Identity Request/Response messages and all other NAS messages are sent to UE 205 encapsulated within EAP-5G Message packets. In the depicted embodiment, the NAS Identity Request/Response messages are embodied in "5G-Message" format messages when transferred between the UE 205 and the N3IWF 220. In other embodiments, the NAS Identity Request/Response messages are embodied in "5G-Challenge" format messages when transferred between the UE 205 and the N3IWF 220.

In certain embodiments, the AMF 140 may decide to authenticate the UE 205. In this case, the normal NAS authentication messages are exchanged between the UE 205, AMF 140, and the AUSF 155, as depicted in signaling 520-534. Again, these NAS authentication messages are encapsulated in EAP-5G Message packets when transferred between the UE 205 and the N3IWF 220. In the depicted embodiment, the NAS Authentication Request/Response messages are embodied in "5G-Message" format messages when transferred between the UE 205 and the N3IWF 220. In other embodiments, the NAS Authentication Request/Response messages are embodied in "5G-Challenge" format messages when transferred between the UE 205 and the N3IWF 220.

As depicted, the AMF 140 sends an AAA key request message to the AUSF 155 and receives an AAA message containing a NAS Authentication Request from the AUSF 155. The AMF 140 sends the Authentication Request to the N3IWF 220 in a N2 message which is converted by the N3IWF 220 into a EAP-5G Message. Similarly, the N3IWF 220 converts a EAP-5G Message containing a NAS Authentication Response (received from the UE 205) into an N2 message which is sent to the AMF 140. The AMF 140 sends an AAA message that contains the NAS Authentication Response to the AUSF 155 and receives an AAA key response message from the AUSF 155 containing a K-SEAF key. Note that the messages 518-534 are optional steps in the network procedure 500 (as indicted by dashed lines).

After successful authentication, the AMF 140 sends a Security Mode Command ("SMC") request to UE 205 in order to activate NAS security (see signaling 536). This message is first sent to N3IWF 220 together with a K_N3IWF key used to establish an IPsec Security Association ("SA") between the UE 205 and N3IWF 220. The UE 205 generates the same K_N3IWF key during the authentication procedure. Before the N3IWF 220 sends the SMC request to UE 205, it completes the EAP authentication procedure by sending an EAP-Success message to UE (see signaling 538). The UE 205 and N3IWF 220 also exchange IKE_AUTH request/response (see signaling 540). Here, an AUTH value is included in the IKE_AUTH exchange.

The secure IPsec tunnel is established between the UE and N3IWF (see block 542). This tunnel uses a Security Association (SA) in the UE 205 and in the N3IWF 220, which contains the security keys and algorithms used to protect data over the tunnel. After the establishment of the IPsec tunnel, all NAS messages between the UE 205 and N3IWF 220 are exchanged via this tunnel.

Via the IPsec tunnel, the N3IWF 220 forwards the SMC request to the UE 205 (see signaling 544) and the remainder of the NAS registration procedure takes place as normally (see block 546). Note that encapsulation of NAS messages within EAP-5G packets is needed during the authentication procedure, but that the EAP protocol is not used after successful authentication. Rather, the NAS messages are transferred within the established IPsec tunnel. As depicted, the result of successful authentication is the establishment of a NAS connection between the UE 205 and the 5G core via the non-3GPP AN 215. Note that the same type of NAS connection is established over the non-3GPP AN 215 as is commonly established over a 3GPP access network.

Figure 7B:
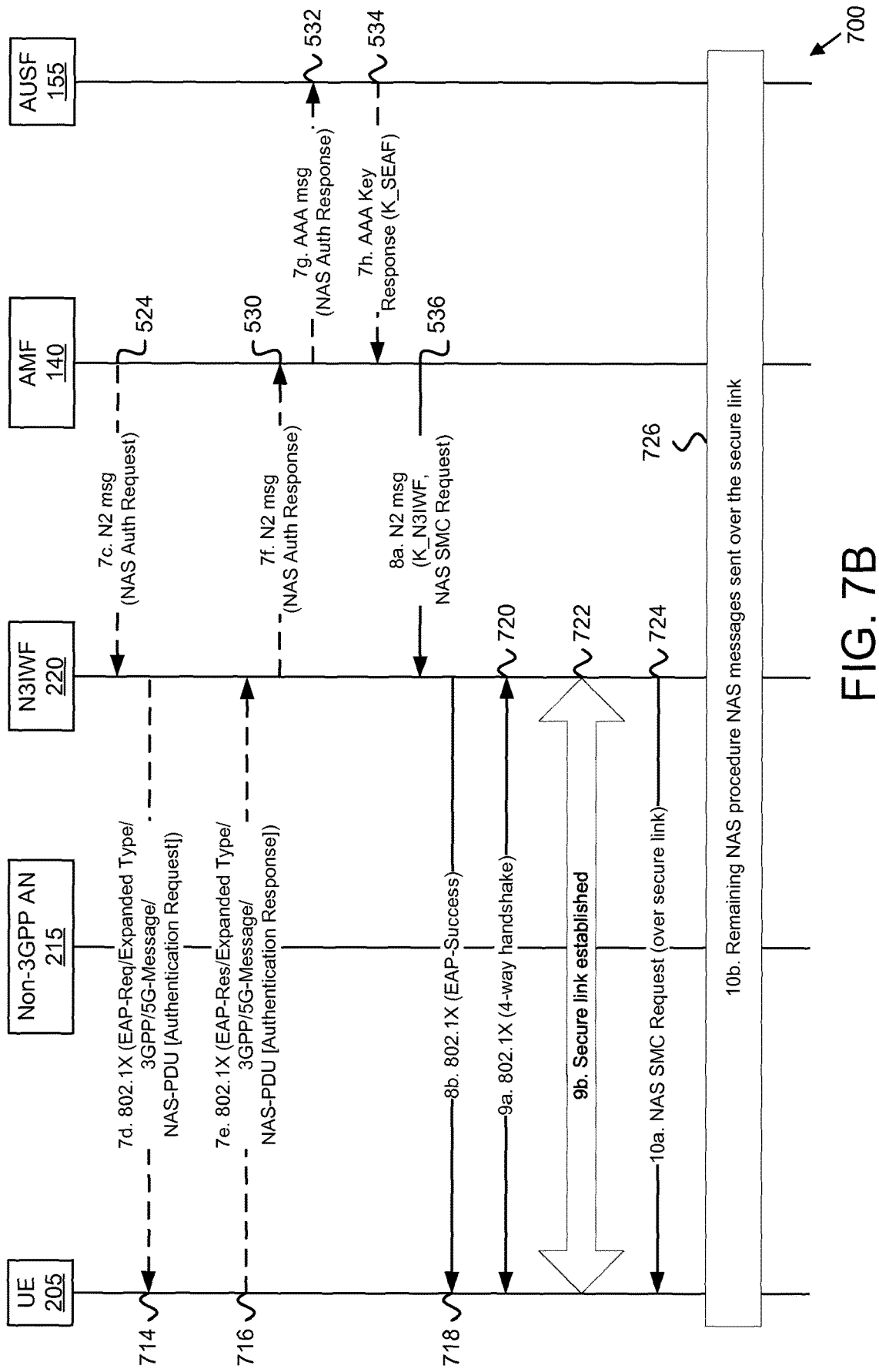
FIG. 7B is a continuation of the network procedure illustrated in FIG. 5A.

Although the network procedure 500 is described in terms of connecting via an untrusted non-3GPP access network, the network procedure 500 is also applicable to trusted non-3GPP access network, the difference being that in the trusted case the EAP messages are not encapsulated within IKEv2 messages (as depicted), but are encapsulated within IEEE 802.1x messages, as depicted in FIGS. 7A and 7B.

Figure 6A:
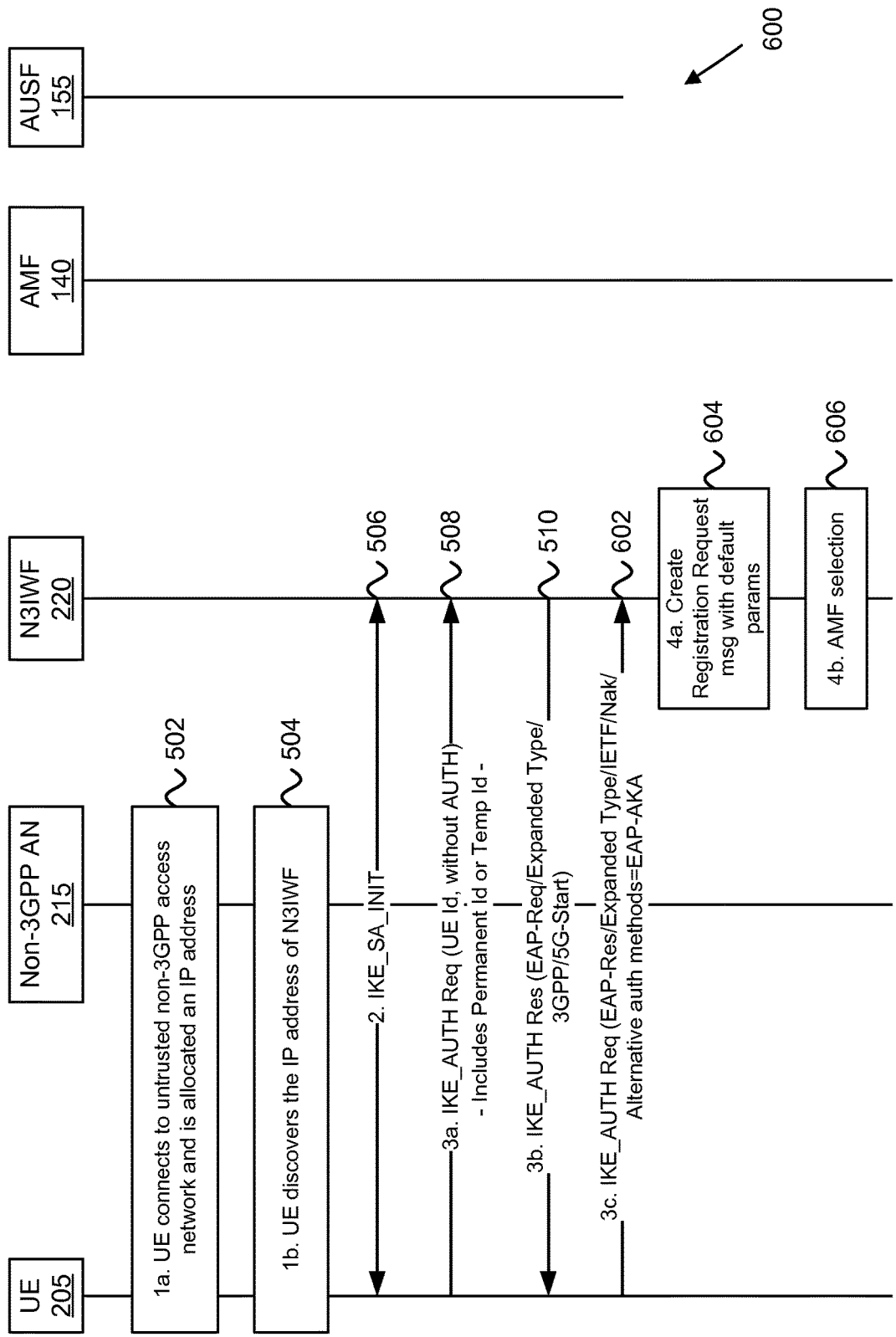
FIG. 6A is a block diagram illustrating another embodiment of a network procedure for using EAP to connect to and authenticate with a mobile communication network over an untrusted non-3GPP access network.
Figure 6B:
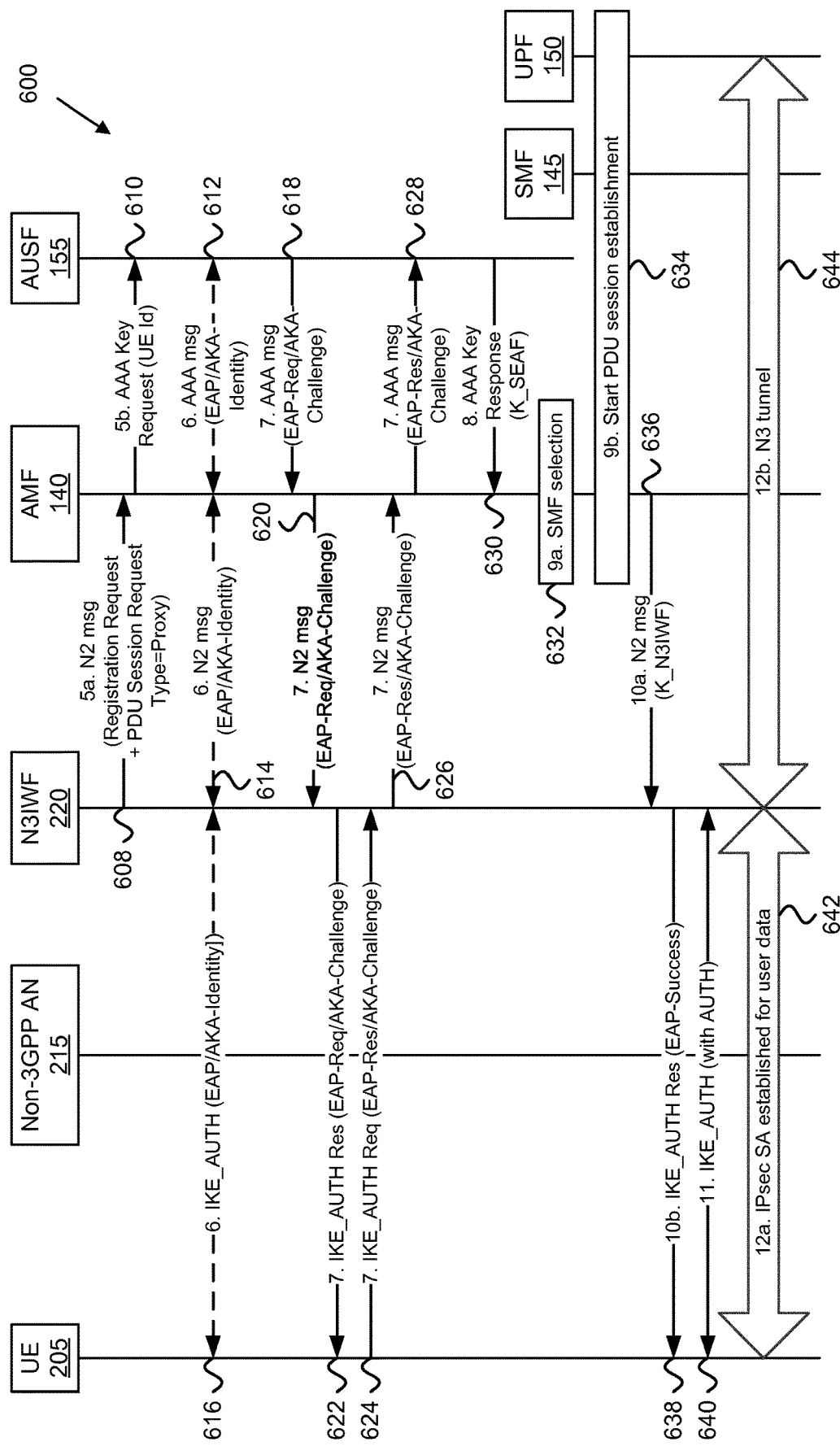
FIG. 6B is a continuation of the network procedure illustrated in FIG. 6A.

FIGS. 6A and 6B depict a network procedure 600 for using EAP to connect to and authenticate with a mobile communication network, e.g., over an untrusted non-3GPP access network, according to embodiments of the disclosure. The network procedure 600 begins in FIG. 6A and continues in FIG. 6B. The network procedure 600 involves the UE 205, the non-3GPP AN 215, the N3IWF 220 G (R)AN 210, the AMF 140, the SMF 145, the UPF 150, and the AUSF 155. The network procedure 600 depicts how a UE 205 that does not supporting the NAS protocols can register to 5G core network via an untrusted non-3GPP access network.

The network procedure 600 begins at FIG. 6A with the UE 205 connecting to the non-3GPP AN 215 and retrieving an IP from this network (see block 502). In doing so, the UE 205 obtains connectivity to an external network, such as the Internet. Here, the non-3GPP AN 215 is an untrusted non-3GPP access network. The UE 205 subsequently decides to register with a 5G core network (e.g., the core network 225) in a certain PLMN and discovers the IP address of an interworking function in this PLMN, here the N3IWF 220 (see block 504).

After discovering the N3IWF 220, the UE 220 begins establishment of an IPsec connection (e.g., IPsec tunnel) with the N3IWF 220 using the IKE_SA_INIT exchange (see signaling 506). Additionally, the UE 205 sends an IKE_AUTH request that includes its permanent or temporary identity (see signaling 508). The N3IWF 220 sends a EAP request message containing a EAP 5G-Start message to inform the UE 205 that it should start a NAS procedure for establishing connectivity with the 5G core network (see signaling 510). Note that the network procedure 600 begins with the same five steps (e.g., corresponding to 502-510) as the network procedure 500. Up to this point, the two network procedures are the same.

Here, the UE 205 determines that is does not support the EAP-5G procedure (e.g., does not support the EAP-5G protocol and its expanded type). Alternatively, the UE 205 may determine that it does not support the NAS messages requested by the network (e.g., the UE 205 does not support the 5G-NAS protocol and its expected message type). In both cases, the UE 205 responds with an EAP-Nak message (e.g., embedded in a EAP response message) which contains a list of one or more alternative EAP method(s) supported by the UE 205, e.g., EAP-AKA (see signaling 602). Note that the EAP-Nak message uses the same EAP expanded type as the EAP 5G-Start message.

In response to the EAP-Nak message, the N3IWF 220 creates a NAS Registration request message (e.g., of a 5G-NAS message type) on behalf of the UE 205 that includes a PDU Session Establishment request (see block 604). This is needed because the AMF 140 still expects a NAS Registration Request message to start the registration procedure, but the UE 205 does not support the EAP-5G protocol and/or does not support the 5G-NAS protocol. Here, the N3IWF 220 may use default parameters in the NAS Registration Request message. The PDU Session Establishment request is required to establish a PDU session for the UE 205 to exchange user-data after the authentication procedure. Note that the UE 205 can only exchange user-data with the 5G core network. Here, signaling is not possible due to lack of NAS protocol support.

Additionally, the N3IWF 220 selects an AMF to forward the NAS Registration Request (see block 606). In certain embodiments, the AMF is selected based on the User Id provided by the UE in step 3a, or by selecting a default AMF. Here, the N3IWF 220 selects the AMF 140 in the PLMN.

Referring now to FIG. 6B, the N3IWF 220 forwards the created NAS Registration request message to the selected AMF 140 (see signaling 608). Here, the N3IWF 220 generates an N2 message that contains the NAS Registration Request. The NAS Registration request message may optionally include an indicator (e.g., type=Proxy) which indicates to AMF 140 that the NAS Registration request was generated by the N3IWF 220 (not by the UE 205) which operates as a proxy for the UE 205. In certain embodiments, the N3IWF 220 may also forward the alternative authentication method(s) supported by the UE 205 (received in the EAP-Nak message), which is sent to AUSF 155 in order to choose the right method to authenticate the UE 205.

In some embodiments, the UE 205 may support the EAP-5G procedure described herein, but does not support the 5G-NAS protocol (and thus does not support a message type (5G-NAS) expected by the AMF 140). Such a UE 205 may include additional information in the EAP-Nak message, such as AN-Params, in order to aid the N3IWF create the proxy NAS Registration request message and the PDU Session Establishment request. Recall, that AN-Params include information for the N3IWF 220 for routing the NAS Registration Request message to the appropriate AMF (here the AMF 140) in the 5G core network.

The AMF 140 begins to authenticate the UE 205 by sending an AAA Key Request message to the AUSF 155 (see signaling 610). In certain embodiments, the AMF 140 and/or the AUSF 155 may decide to request a UE identity of the UE 205. Because NAS messages are not possible (due to lack of support at the UE 205), the AUSF 155 sends an EAP-AKA Identity Request message to UE 205 via the AMF 140 and N3IWF 220, to which the UE 205 generates an EAP-AKA Identity Response message (see signaling 612-616). Here, the AMF 140 receives an AAA message from the AUSF 155 and sends a N2 message containing the EAP-AKA Identity Request to the N3IWF 220. The N3IWF 220 converts the N2 message into an IKE_AUTH message. Similarly, the UE 205 sends an IKE_AUTH message containing the EAP-AKA Identity Response, the N3IWF 220 converts the IKE_AUTH message into an N2 message, and the AMF 140 converts the N2 message into an AAA message. Here, steps 612-616 are optional in the network procedure 600 (as indicted by dashed lines).

In authenticating the UE 205, EAP-AKA authentication messages (e.g., EAP-AKA Challenge request and response) are exchanged between the UE 205, N3IWF 220, AMF 140, and the AUSF 155, as depicted in signaling 618-628. As depicted, the AMF 140 receives an AAA message containing a EAP-AKA Challenge request from the AUSF 155. The AMF 140 sends the EAP-AKA Challenge request to the N3IWF 220 in a N2 message which is converted by the N3IWF 220 into a IKE_AUTH message containing the EAP-AKA Challenge request. Similarly, the N3IWF 220 converts a IKE_AUTH message containing a EAP-AKA Challenge response (received from the UE 205) into an N2 message which is sent to the AMF 140. The AMF 140 sends an AAA message that contains the EAP-AKA Challenge response to the AUSF 155. After completion of the EAP-AKA Challenge, the AMF 140 receives an AAA key response message from the AUSF 155 with a K_SEAF key (see signaling 630).

After the successful authentication procedure, the AMF 140 selects an SMF for the UE 205 (see block 632) and starts the establishment of the PDU session for the UE 205 (see block 634). In certain embodiments, the AMF 140 uses default AN-Params, e.g. default S-NSSAI (slicing info), default DNN (Data Network Name), default SSC mode (Session and Service Continuity), etc. These default parameters may be retrieved from the user's subscription data. Where the UE 205 provides AN-Params to the AMF 140, the AMF 140 may use these AN-Params when establishing the PDU session.

In response to establishing the PDU session, the AMF 140 sends an N2 message to the N3IWF 220 with a K_N3IWF key used to establish an IPsec Security Association ("SA") between the UE 205 and the N3IWF 220 (see signaling 636). The UE 205 generates the same K_N3IWF key during the authentication procedure. The N3IWF 220 completes the EAP authentication procedure by sending an EAP-Success message to the UE 205 (see signaling 638). The UE 205 and the N3IWF 220 also exchange IKE_AUTH request/response (see signaling 640). Here, an AUTH value is included in the IKE_AUTH exchange.

The secure IPsec tunnel is established between the UE 205 and the N3IWF 220 (see block 642). This tunnel uses a Security Association (SA) in the UE 205 and in the N3IWF 220, which contains the security keys and algorithms used to protect data over the tunnel. Additionally, an N3 tunnels is established between the N3IWF 220 and the UPF 150. Here, the IPsec tunnel is used to transport user data, but not NAS messages. Also, during the IPsec tunnel establishment the UE 205 receives from the N3IWF 220 an IP address allocated by the SMF 145 for the established PDU session. Note that in the network procedure 500 the UE 205 does not receive an IP address from the N3IWF 220; this is not needed because the IPsec tunnel in the network procedure 500 is used for NAS signaling only.

Although the network procedure 600 is described in terms of connecting via an untrusted non-3GPP access network, the network procedure 600 is also applicable to trusted non-3GPP access network, the difference being that in the trusted case the EAP messages are not encapsulated within IKEv2 messages (as depicted), but are encapsulated within IEEE 802.1x messages.

FIGS. 7A and 7B depict a network procedure 700 for using EAP to authenticate and establish a NAS connection with a mobile communication network, e.g., over a trusted non-3GPP access network, according to embodiments of the disclosure. The network procedure 700 begins in FIG. 7A and continues in FIG. 7B. The network procedure 700 involves the UE 205, the non-3GPP AN 215, the N3IWF 220 G (R)AN 210, the AMF 140, and the AUSF 155.

The network procedure 700 depicts how the new EAP-5G procedure disclosed herein is used to enable a UE 205 to register to a 5G core network (e.g., the core network 225) via a trusted non-3GPP access, here depicted as the non-3GPP AN 215. Note that the new EAP-5G procedure runs between the UE 205 and the N3IWF 220 and enables the exchange of NAS messages and other information between the UE 205 and N3IWF 220 during the authentication procedure. In some embodiments, the N3IWF 220 may be located inside the trusted non-3GPP access network (e.g., within the non-3GPP AN 215).

The network procedure 700 begins at FIG. 7A with the UE 205 connecting to the non-3GPP AN 215 and beginning an IEEE 802.1X authentication procedure (see block 702). Here, the non-3GPP AN 215 is a trusted non-3GPP access network under to control of the operator of the AMF 140 and AUSF 155. The UE 205 subsequently decides to register with the 5G core network (e.g., the core network 225) associated with the trusted non-3GPP access network and sends an 802.1X Start message (see signaling 704). While FIG. 7A-7B depict the UE 205 using an 802.1X protocol, in other embodiments other link-layer protocols may be used, such as the Point-to-Point Protocol ("PPP").

The N3IWF 220 sends a EAP-5G request message containing a 5G-Start message to inform the UE 205 that it should start a NAS procedure (e.g., 5G-NAS) for establishing connectivity with the 5G core network (see signaling 706). Here, the EAP-5G request message is embedded within an 802.1X message. Note that the 5G-Start message uses a first EAP expanded type (e.g., that corresponds to the EAP-5G protocol).

The UE 205 responds with a 5G-Message format message (e.g., embedded in a EAP-5G response message) which contains Access Network parameters ("AN-Params") and a NAS Registration Request message (see signaling 708). Alternatively, the UE 205 may response with a 5G-Challenge format message (e.g., embedded in a EAP-5G response message) which contains the AN-Params and the NAS Registration Request message. Note that the 5G-Message also uses the first EAP expanded type (e.g., EAP-5G expanded type). The AN-Params include information for the N3IWF 220 for routing the NAS Registration Request message to the appropriate AMF (here the AMF 140) in the 5G core network. While FIG. 7A depicts a NAS Registration Request (specifically a NAS-PDU Registration Request) being sent by the UE 205 to the N3IWF, in other embodiments another appropriate NAS message could be used, such as a NAS Service Request.

In response to the 5G-Message, the N3IWF 220 selects an AMF to forward the NAS Registration Request to by using the AN-Params provided by the UE (see block 710). Here, the N3IWF 220 selects the AMF 140 in the PLMN. Next, the N3IWF 220 forwards the NAS Registration Request message to the selected AMF 140 (see signaling 516). Here, the N3IWF 220 generates an N2 message that contains the NAS Registration Request. Where, the 5G-Message received from the UE 205 contains a NAS Service Request (or other NAS message), the N3IWF 220 forwards the NAS Service Request message (or other NAS message) to the selected AMF.

In certain embodiments, the AMF 140 may decide to request a UE identity of the UE 205 (e.g. to detect stolen UEs) by using sending a NAS Identity Request message to UE 205 via the N3IWF 220 (see signaling 518). Here, the AMF 140 sends a N2 message containing the NAS Identity Request and the N3IWF 220 converts the N2 message into an EAP-5G message. Similarly, the UE 205 sends an EAP-5G message containing the NAS Identity Response (embedded within an 802.1X message) (see signaling 712). Here, the N3IWF 220 converts the 802.1X/EAP-5G message into an N2 message. The NAS Identity Request/Response messages and all other NAS messages are sent to UE 205 encapsulated within EAP-5G Message packets (embedded in 802.1X message). Note that steps 518 and 712 are optional in the network procedure 700. In the depicted embodiment, the NAS Identity Request/Response messages are embodied in "5G-Message" format messages when transferred between the UE 205 and the N3IWF 220. In other embodiments, the NAS Identity Request/Response messages are embodied in "5G-Challenge" format messages when transferred between the UE 205 and the N3IWF 220.

In certain embodiments, the AMF 140 may decide to authenticate the UE 205. The AMF 140 begins by sending an AAA key request message to the AUSF 155 (see signaling 520) and receives an AAA message containing a NAS Authentication Request from the AUSF 155 (see signaling 522). Continuing on FIG. 7B, The AMF 140 sends the NAS Authentication Request to the N3IWF 220 in a N2 message (see signaling 524) which is converted by the N3IWF 220 into a EAP-5G Message that is sent to the UE 205 (see signaling 714). Similarly, the N31WF 220 receives from the UE 205 a EAP-5G Message containing a NAS Authentication Response (see signaling 716) and converts it into an N2 message which is sent to the AMF 140 (see signaling 530). In the depicted embodiment, the NAS Authentication Request/Response messages are embodied in "5G-Message" format messages when transferred between the UE 205 and the N3IWF 220. In other embodiments, the NAS Authentication Request/Response messages are embodied in "5G-Challenge" format messages when transferred between the UE 205 and the N3IWF 220.

The AMF 140 sends an AAA message that contains the NAS Authentication Response to the AUSF 155 (see signaling 532) and receives an AAA key response message from the AUSF 155 containing a K-SEAF key (see signaling 534). Note that the UE authentication messages (e.g., 522, 524, 714, 716, 530, 532, and 534) are optional steps in the network procedure 500 (as indicted by dashed lines). Again, these NAS authentication messages are encapsulated in EAP-5G Message packets when transferred between the UE 205 and the N3IWF 220 using 802.1X messages.

After successful authentication, the AMF 140 sends a Security Mode Command ("SMC") request to UE 205 in order to activate NAS security (see signaling 536). This message is sent to N3IWF 220 together with a K_N3IWF key used to establish an IPsec Security Association ("SA") between the UE 205 and N3IWF 220. The UE 205 generates the same K_N3IWF key during the authentication procedure. Before the N3IWF 220 sends the SMC request to UE 205, it completes the EAP authentication procedure by sending an EAP-Success message to UE (see signaling 718). The UE 205 and N3IWF 220 then perform an 802.1X 4-way handshake to create additional security keys (see signaling 720).

A secure link is then established between the UE and N31WF (see block 722). Here, the secure link is used for both NAS signaling and for PDU session data. Via the secure link, the N3IWF 220 forwards the SMC request to the UE 205 (see signaling 724) and the remainder of the NAS registration procedure takes place as normally over the secure link (see block 726). Here, the result of successful authentication is the establishment of a NAS connection between the UE 205 and the 5G core via the non-3GPP AN 215. Note that the same type of NAS connection is established over the non-3GPP AN 215 as is commonly established over a 3GPP access network.

Figure 8:
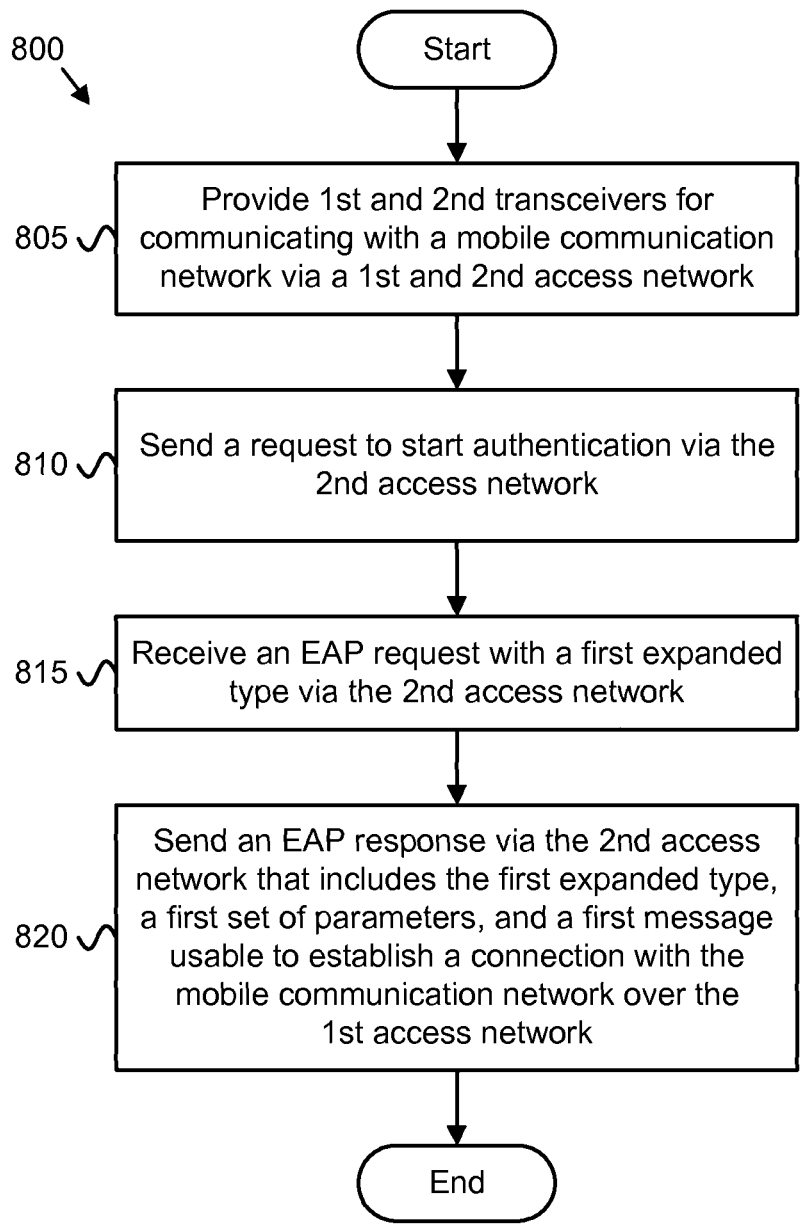
FIG. 8 is a schematic flow diagram illustrating one embodiment of a method authenticating with a mobile communication network.

FIG. 8 depicts a method 800 for authenticating with a mobile communication network, e.g., over a non-3GPP access network, according to embodiments of the disclosure. In some embodiments, the method 800 is performed by an apparatus, such as the remote unit 105, the UE 205, and/or the remote apparatus 300. In certain embodiments, the method 800 may be performed by a processor executing program code, for example, a microcontroller, a microprocessor, a CPU, a GPU, an auxiliary processing unit, a FPGA, or the like.

The method 800 begins and provides 805 a first transceiver for communicating with a mobile communication network via a first access network and a second transceiver for communicating with the mobile communication network via a second access network. Here, the first and second transceivers are provided 805 in a remote unit, such as the remote unit 105, the UE 205, and/or the remote apparatus 300. In one embodiment, the second access network is a non-3GPP access network, such as a wireless local area network ("WLAN").

The method 800 includes sending 810 a request to start authentication via the second access network. In certain embodiments, sending 810 the request to start authentication via the second access network includes sending a request to connect to a mobile communication network over an untrusted non-3GPP access network and then start authentication via the untrusted non-3GPP access network. In other embodiments, sending 810 the request to start authentication via the second access network includes sending a request to start authentication via a trusted non-3GPP access network.

In one embodiment, the connection request identifies the remote unit, e.g., using a permanent or temporary UE identifier. The method 800 includes receiving 815 an extensible authentication protocol ("EAP") request with a first expanded type (e.g., EAP-5G expanded type) via the second access network. Here, the first expanded type may be a 3GPP-specific type, such as an EAP-5G expanded packet. In one embodiment, the EAP request with the first expanded type corresponds to an EAP 5G-Start message. The EAP request may also be embedded within an IKEv2 message, such as an IKE-AUTH response. Note that the EAP request indicates to the remote unit to start a specific authentication method that requires the use of 5G-NAS message inside EAP-5G messages.

The method 800 includes sending 820 an EAP response via the second access network (e.g., non-3GPP access network), the EAP response comprising the first expanded type (e.g., EAP-5G expanded type corresponding to the EAP-5G protocol), a first set of parameters (e.g., AN-Params), and a first message. Here, the first message is a same type of message usable to establish a connection with the mobile communication network over the first access network (e.g., a 5G-NAS message usable to connect over a 3GPP access network). In one embodiment, the first message is a non-access stratum ("NAS") registration request. In certain embodiments, sending 820 EAP response includes initiating a secure IPsec connection with an interworking function. Future NAS messages may be exchanged with the mobile communication network via the secure IPsec connection.

In some embodiments, sending 820 the EAP response includes receiving one or more additional EAP-5G requests and sending an equal number of EAP-5G responses. Here, each of the additional EAP-5G requests and responses encapsulates at least one 5G-NAS message. In this manner, the remote unit may be identified and authenticated using 5G-NAS messages. Here, the result of successful authentication is the establishment of a NAS connection between the remote unit and the 5G core network via the non-3GPP access. Accordingly, the remote unit may establish the NAS connection with the mobile communication network via the additional EAP requests and responses.

In response to determining that the first expanded type (e.g., EAP-5G expanded type associated with the EAP-5G protocol) is not supported by the remote unit, sending 820 the EAP response via the second access network may include sending an EAP response including the first expanded type and a list of authentication methods supported by the remote unit for authenticating with the mobile communication network via the second access network. Thereafter, the remote unit may be authenticated with mobile communication network using one of the supported authentication methods.

In response to determining that an expected message type (e.g., 5G-NAS message type associated with the 5G-NAS protocol) is not supported by the apparatus, sending 820 the EAP response via the second access network may include sending an EAP response that includes the first expanded type (e.g., EAP-5G expanded type) and one or more additional parameters usable by an interworking function to generate a message of the expected message type (e.g., 5G-NAS message) on behalf of the remote unit. Here, the interworking function may (optionally) include an indication that the message of the expected message type (e.g., 5G-NAS message) is created by the interworking function on behalf of the remote unit. The method 800 ends.

Figure 9:
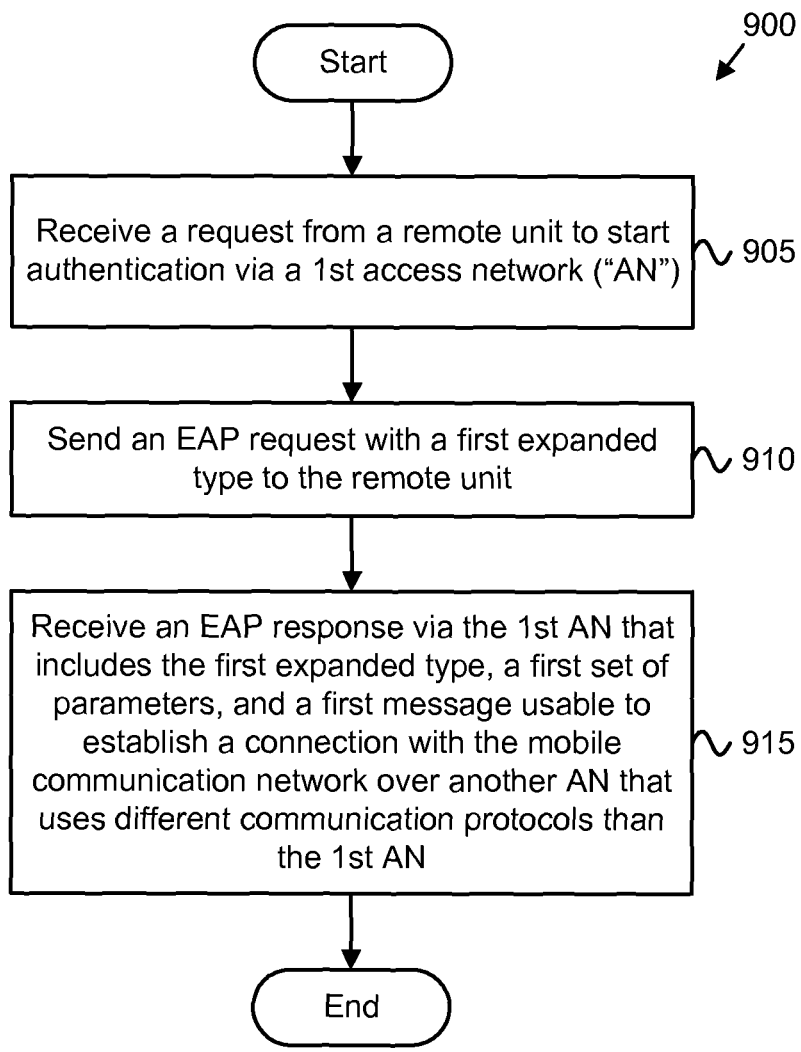
FIG. 9 is a schematic flow chart diagram illustrating one embodiment of a method for authenticating with a mobile communication network.

FIG. 9 depicts a method 900 for authenticating with a mobile communication network, e.g., over a non-3GPP access network, according to embodiments of the disclosure. In some embodiments, the method 900 is performed by an apparatus, such as the interworking function 130, the N3IWF 220, and/or the interworking apparatus 400. In certain embodiments, the method 900 may be performed by a processor executing program code, for example, a microcontroller, a microprocessor, a CPU, a GPU, an auxiliary processing unit, a FPGA, or the like.

The method 900 begins and receives 905 a request from a remote unit to start authentication via a first access network. In some embodiments, the first access network is a WLAN or other non-3GPP access network. In one embodiment, the connection request identifies the remote unit, e.g., using a permanent or temporary UE identifier. In some embodiments, receiving 905 the request to start authentication includes receiving a request to connect to a mobile communication network and start authentication via an untrusted non-3GPP access network. In another embodiment, receiving 905 the request to start authentication includes receiving a request to start authentication via a trusted non-3GPP access network The method 900 includes sending 910 an extensible authentication protocol ("EAP") request with a first expanded type (e.g., EAP-5G expanded type) to the remote unit. Here, the first expanded type may be a 3GPP-specific type, such as an EAP-5G expanded packet. In one embodiment, the EAP request with the first expanded type corresponds to an EAP 5G-Start message. The EAP request may also be embedded within an IKEv2 message, such as an IKE-AUTH response.

In certain embodiments, sending 910 the EAP request occurs in response to the request from the remote unit to start authentication including an indication that the remote unit supports EAP messaging using the first expanded type. Otherwise, if a remote unit indicates that it does not support the first expanded type (e.g., does not support the EAP-5G protocol), then an EAP request without the first expanded type is sent to that remote unit.

The method 900 includes receiving 915 an EAP response via the first access network, the EAP response comprising the first expanded type (e.g., EAP-5G expanded type), a first set of parameters (e.g., AN-Params), and a first message. Here, the first message is a same type of message (e.g., 5G-NAS message type) usable to establish a connection with the mobile communication network over another access network (e.g., over a 3GPP access network) that uses different communication protocols than the first access network. In some embodiments, the first message is a non-access stratum ("NAS") registration request. In certain embodiments, receiving 915 the EAP response triggers the establishment of a secure IPsec connection with the remote unit. Future NAS messages may be exchanged between the remote unit and the mobile communication network via the secure IPsec connection.

In some embodiments, receiving 915 the EAP response includes sending one or more additional EAP-5G requests and receiving an equal number of EAP-5G responses. Here, each of the additional EAP-5G requests and responses encapsulates at least one 5G-NAS message. In this manner, the interworking function may identify and authenticate the remote unit using 5G-NAS messages. Here, the result of successful authentication is the establishment of a NAS connection between the remote unit and the 5G core network via the non-3GPP access. Accordingly, the remote unit may establish the NAS connection with the mobile communication network via the additional EAP requests and responses.

In some embodiments, receiving 915 the EAP response includes receiving, at an interworking function, an indication that the first expanded type (e.g., EAP-5G expanded type associated with the EAP-5G protocol) is not supported by the remote unit, wherein the EAP response contains the first expanded type and a list of authentication methods supported by the remote unit for authenticating with the mobile communication network via the second access network. Here, the interworking function may forward the list of authentication methods to the mobile community network (e.g., to an AUSF 155). In certain embodiments, the interworking function may then send an NAS message to the mobile communication network on behalf of the remote unit and optionally include an indication that the NAS message is created by the interworking function on behalf of the remote unit. In one embodiment, the NAS message is one of an NAS registration request, an NAS registration request containing a session establishment request, and an NAS service request.

In certain embodiments, receiving 915 the EAP response includes receiving, at an interworking function, an indication that an expected message type is not supported by the remote unit (e.g., that the remote unit does not support the 5G-NAS protocol and its associated message type), wherein the EAP response contains the first expanded type and one or more additional parameters usable to generate a message of the expected message type on behalf of the remote unit and an indication that the message of the expected message type is created by the interworking function on behalf of the remote unit. The method 900 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a transceiver that communicates with a mobile communication network via a first access network and communicates with the mobile communication network via a second access network, the second access network comprising a non-3GPP access point and a non-3GPP interworking function; and
a processor that:
sends a first request to start authentication with the mobile communication network via the second access network;
receives an extensible authentication protocol ("EAP") start packet, the EAP start packet initiating an EAP session between the apparatus and the non-3GPP interworking function, the EAP session utilizing an EAP-5G expanded type, wherein the EAP-5G expanded type indicates that the EAP session is initiated to establish a signaling connection between the apparatus and the mobile communication network via the second access network;
sends an EAP response via the second access network, the EAP response utilizing the EAP-5G expanded type and comprising a first set of access network parameters and a first message,
wherein the first message is a same type of message usable to establish a signaling connection with the mobile communication network over the first access network, wherein the first access network uses different communication protocols than the second access network, and wherein the first set of access network parameters comprises a PLMN identity of the mobile communication network and network slice selection assistance information.

2. The apparatus of claim 1, wherein the first message is a non-access stratum ("NAS") registration request, wherein the second access network is a wireless local area network ("WLAN").

3. The apparatus of claim 2, wherein the processor further establishes a secure IPsec connection with the non-3GPP interworking function in response to completing the authentication with the mobile communication network and exchanges NAS messages with the mobile communication network via the secure IPsec connection.

4. The apparatus of claim 1, wherein the processor further receives one or more additional EAP requests and sends an equal number of EAP responses, wherein each of the additional EAP requests and responses encapsulates at least one non-access stratum ("NAS") message, wherein the processor establishes a NAS connection with the mobile communication network via the additional EAP requests and responses.

5. The apparatus of claim 1, wherein the processor further determines that the EAP-5G expanded type is not supported by the apparatus, wherein sending the EAP response via the second access network comprises sending an EAP response utilizing the EAP-5G expanded type and a list of authentication methods supported by the apparatus for authenticating with the mobile communication network via the second access network.

6. The apparatus of claim 5, wherein the processor further authenticates with the mobile communication network using one of the authentication methods supported by the apparatus.

7. The apparatus of claim 1, wherein the processor further determines that a protocol associated with an expected message type is not supported by the apparatus, wherein sending the EAP response via the second access network comprises sending an EAP response that utilizes the EAP-5G expanded type and one or more additional parameters usable by an interworking function to generate a message of the expected message type on behalf of the apparatus.

8. The apparatus of claim 7, wherein the generated message of the expected message type contains an indication that the generated message is created by the interworking function on behalf of the apparatus.

9. A method comprising:
providing a transceiver for communicating with a mobile communication network via a first access network and via a second access network, the second access network comprising a non-3GPP access point and a non-3GPP interworking function;
sending a first request to start authentication with the mobile communication network via the second access network;
receiving, at a remote unit, an extensible authentication protocol ("EAP") start packet, the EAP start packet initiating an EAP session between the apparatus and the non-3GPP interworking function, the EAP session utilizing an EAP-5G expanded type, wherein the EAP-5G expanded type indicates that the EAP session is initiated to establish a signaling connection between the apparatus and the mobile communication network via the second access network;
sending an EAP response via the second access network, the EAP response utilizing the EAP-5G expanded type and comprising a first set of access network parameters and a first message,
wherein the first message is a same type of message usable to establish a signaling connection with the mobile communication network over the first access network, wherein the first access network uses different communication protocols than the second access network, and wherein the first set of access network parameters comprises a PLMN identity of the mobile communication network and network slice selection assistance information.

10. An apparatus comprising:
a transceiver that communicates with a remote unit via a non-3GPP first access network;
a network interface that communicates with a mobile communication network; and
a processor that:
receives a first request from the remote unit to start authentication with the mobile communication network via the first access network;
sends an extensible authentication protocol ("EAP") start packet, the EAP start packet initiating an EAP session between the apparatus and the non-3GPP interworking function, the EAP session utilizing an EAP-5G expanded type, wherein the EAP-5G expanded type indicates that the EAP session is initiated to establish a signaling connection between the apparatus and the mobile communication network via the second access network; and
receives an EAP response via the EAP session, the EAP response utilizing the EAP-5G expanded type and comprising a first set of access network parameters and a first message,
wherein the first message is a same type of message usable to establish a signaling connection with the mobile communication network over the first access network, wherein the first access network uses different communication protocols than the second access network, and wherein the first set of access network parameters comprises a PLMN identity of the mobile communication network and network slice selection assistance information.

11. The apparatus of claim 10, wherein the first message is a non-access stratum ("NAS") registration request, wherein the first access network is a wireless local area network ("WLAN").

12. The apparatus of claim 11, wherein the processor further establishes a secure IPsec connection with the remote unit in response to completing the authentication with the mobile communication network and relays NAS messages between the remote unit and the mobile communication network via the secure IPsec connection.

13. The apparatus of claim 10, wherein the processor further sends one or more additional EAP requests and receives an equal number of EAP responses, wherein each of the additional EAP requests and responses encapsulates at least one non-access stratum ("NAS") message, wherein the remote unit establishes a NAS connection with the mobile communication network via the additional EAP requests and responses.

14. The apparatus of claim 10, wherein the processor further receives an indication that the EAP-5G expanded type is not supported by the remote unit, wherein receiving the EAP response via the first access network comprises receiving an EAP response utilizing the EAP-5G expanded type and a list of authentication methods supported by the remote unit for authenticating with the mobile communication network via the second access network.

15. The apparatus of claim 14, wherein the processor further sends a non-access stratum ("NAS") message to the mobile communication network on behalf of the remote unit.

16. The apparatus of claim 15, wherein the processor further sends an indication that the NAS message is created by the apparatus on behalf of the remote unit.

17. The apparatus of claim 15, wherein the NAS message is one of: a NAS registration request and a NAS service request.

18. The apparatus of claim 15, wherein the NAS message is a NAS registration request that includes a session establishment request.

19. The apparatus of claim 14, wherein the processor further forwards the list of authentication methods supported by the remote unit to the mobile communication network.

20. The apparatus of claim 10, wherein the processor further receives an indication that a protocol associated with an expected message type is not supported by the remote unit, wherein receiving the EAP response via the first access network comprises receiving an EAP response that utilizes the EAP-5G expanded type and one or more additional parameters usable to generate a message of the expected message type on behalf of the remote unit.

21. The apparatus of claim 20, wherein the processor generates the message of the expected message type on behalf of the remote unit, wherein the generated message includes an indication that the message is created on behalf of the remote unit.

22. The apparatus of claim 15, wherein the request from the remote unit to authenticate with the mobile communication network includes an indication that the remote unit supports EAP messaging using the EAP-5G expanded type, wherein sending the EAP request with the EAP-5G expanded type occurs in response to the indication.

23. The apparatus of claim 15, wherein the processor further receives a second request to authenticate with the mobile communication network via the first access network from a second remote unit, the second request indicating that the remote unit does not support the EAP-5G expanded type, wherein the processor sends an EAP request without the EAP-5G expanded type to the second remote unit.

24. A method comprising:
  receiving a first request from a remote unit to start authentication with the mobile communication network via a non-3GPP first access network;
  sending an extensible authentication protocol ("EAP") start packet, the EAP start packet initiating an EAP session between the apparatus and the non-3GPP interworking function, the EAP session utilizing an EAP-5G expanded type, wherein the EAP-5G expanded type indicates that the EAP session is initiated to establish a signaling connection between the apparatus and the mobile communication network via the second access network; and
  receiving an EAP response via the EAP session, the EAP response comprising the EAP-5G expanded type and comprising a first set of access network parameters and a first message,
  wherein the first message is a same type of message usable to establish a signaling connection with the mobile communication network over the first access network, wherein the first access network uses different communication protocols than the second access network, and wherein the first set of access network parameters comprises a PLMN identity of the mobile communication network and network slice selection assistance information.

* * * * *

UNITED STATES PATENT AND TRADEMARK OFFICE
CERTIFICATE OF CORRECTION

PATENT NO. : 10,986,481 B2
APPLICATION NO. : 16/347322
DATED : April 20, 2021
INVENTOR(S) : Apostolis Salkintzis Page 1 of 2

It is certified that error appears in the above-identified patent and that said Letters Patent is hereby corrected as shown below:

In the Claims

Column 27, Claim 10, Line 61:
"via the first access network;" should read "via the non-3GPP first access network;"

Column 27, Claim 10, Line 64 to Line 65:
"and the non-3GPP interworking function;" should read "and a non-3GPP interworking function;"

Column 28, Claim 10, Line 2 to Line 3:
"via the second access network;" should read "via a second access network;"

Column 28, Claim 10, Line 10 to Line 11:
"over the first access network," should read "over the second access network,"

Column 28, Claim 10, Line 11:
"wherein the first access network" should read "wherein the non-3GPP first access network"

Column 28, Claim 10, Line 14:
"comprises a PLMN identity" should read "comprises a public land mobile network (PLMN) identity"

Column 28, Claim 11, Line 20:
"wherein the first access network" should read "wherein the non-3GPP first access network"

Column 29, Claim 24, Line 20:
"A method comprising:" should read "A method performed at an apparatus, the method comprising:"

Column 29, Claim 24, Line 22:
"with the mobile communication network" should read "with a mobile communication network"

Signed and Sealed this
Fifteenth Day of October, 2024

Katherine Kelly Vidal
*Director of the United States Patent and Trademark Office*

CERTIFICATE OF CORRECTION (continued) Page 2 of 2
U.S. Pat. No. 10,986,481 B2

Column 30, Claim 24, Line 3 to Line 4:
"and the non-3GPP interworking function;" should read "and a non-3GPP interworking function;"

Column 30, Claim 24, Line 8 to Line 9:
"via the second access network;" should read "via a second access network;"

Column 30, Claim 24, Line 16 to Line 17:
"over the first access network," should read "over the second access network,"

Column 30, Claim 24, Line 17:
"wherein the first access network" should read "wherein the non-3GPP first access network"

Column 30, Claim 24, Line 20:
"comprises a PLMN identity" should read "comprises a public land mobile network (PLMN) identity"